United States Patent
Matsushima

(10) Patent No.: US 11,679,501 B2
(45) Date of Patent: Jun. 20, 2023

(54) CONTROLLER FOR DETERMINING MODIFICATION METHOD OF POSITION OR ORIENTATION OF ROBOT

(71) Applicant: FANUC CORPORATION, Yamanashi (JP)

(72) Inventor: Tomonori Matsushima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 322 days.

(21) Appl. No.: 17/061,474

(22) Filed: Oct. 1, 2020

(65) Prior Publication Data

US 2021/0138646 A1 May 13, 2021

(30) Foreign Application Priority Data

Nov. 7, 2019 (JP) .................................. 2019-202603

(51) Int. Cl.
*B25J 9/16* (2006.01)
*B25J 15/00* (2006.01)
(Continued)

(52) U.S. Cl.
CPC ........... *B25J 9/1664* (2013.01); *B25J 9/1684* (2013.01); *B25J 9/1697* (2013.01); *B23K 9/0956* (2013.01); *B23K 9/127* (2013.01); *B23K 31/125* (2013.01); *B25J 15/0019* (2013.01); *G05B 2219/37217* (2013.01)

(58) Field of Classification Search
CPC ...... B25J 9/1664; B25J 9/1684; B25J 9/1697; B25J 15/0019; G05B 19/042; G05B 2219/36414; G05B 2219/37217; G05B 2219/45104; G05B 2219/4704;
(Continued)

(56) References Cited

U.S. PATENT DOCUMENTS

| 2013/0026148 | A1* | 1/2013 | Aoyama | ................ B23K 37/00 901/42 |
| 2016/0236414 | A1* | 8/2016 | Reese | .................... B33Y 50/02 |

(Continued)

FOREIGN PATENT DOCUMENTS

| JP | H07098217 A | 4/1995 |
| JP | H09072717 A | 3/1997 |

(Continued)

*Primary Examiner* — Abby Y Lin
*Assistant Examiner* — Karston G. Evans
(74) *Attorney, Agent, or Firm* — Hauptman Ham, LLP

(57) ABSTRACT

A controller calculates a correction amount of a position of a robot 1 at a movement point in a first movement path, and drives the robot 1 in a second movement path obtained by correcting the first movement path. The controller includes a second camera configured to detect a shape of a part after a robot apparatus performs a task, and a variable calculating unit configured to calculate, based on an output of the second camera, a quality variable representing quality of a workpiece. When the quality variable deviates from a predetermined determination range, a determination unit of the controller determines that the position or an orientation of the robot 1 needs to be modified based on a correlation between the correction amount of the position in the first movement path and the quality variable.

9 Claims, 14 Drawing Sheets

(51) Int. Cl.
    *B23K 9/127*      (2006.01)
    *B23K 9/095*      (2006.01)
    *B23K 31/12*      (2006.01)

(58) Field of Classification Search
    CPC ...... B23K 26/21; B23K 9/127; B23K 26/702;
                        B23K 9/0956; B23K 31/125
    See application file for complete search history.

(56)              References Cited

U.S. PATENT DOCUMENTS

2017/0090431 A1*  3/2017  Komatsu .............. B23K 9/1274
2019/0160577 A1*  5/2019  Guymon ................ G06Q 10/20
2021/0001423 A1*  1/2021  Boillot ...................... G06T 7/80

FOREIGN PATENT DOCUMENTS

JP          2004255547 A      9/2004
JP          2016140958 A      8/2016

* cited by examiner

US 11,679,501 B2

CONTROLLER FOR DETERMINING MODIFICATION METHOD OF POSITION OR ORIENTATION OF ROBOT

RELATED APPLICATIONS

The present application claims priority of Japanese Application Number 2019-202603 filed Nov. 7, 2019, the disclosure of which is hereby incorporated by reference herein in its entirety.

BACKGROUND OF THE INVENTION

1. Field of the Invention

The present invention relates to a controller for determining a modification method of a position or an orientation of a robot.

2. Description of the Related Art

A robot apparatus includes a robot, an operation tool attached to the robot, and a controller for controlling the robot. The controller drives the robot and the operation tool based on an operation program. An operator can teach teaching points in advance in order to determine a position and an orientation of the robot. The operation program is created based on positions of the teaching points and orientations of the robot at the teaching points. When driving the robot, the controller can set an interpolation point between the teaching points based on the teaching points. The controller controls the robot so as to be at the positions and in the orientations that are defined at the teaching points and the interpolation points.

In the related art, a control for detecting a position of a workpiece by a camera and correcting a position and an orientation of a robot according to the position of the actual workpiece during a period of time in which the robot apparatus is performing a task has been known (e.g., Japanese Unexamined Patent Publication No. 9-72717A). Alternatively, a control for correcting a movement path based on an image or the like of an actual workpiece when an operation program is created in an off-line state has been known. (e.g., Japanese Unexamined Patent Publication No. 2004-255547A and Japanese Unexamined Patent Publication No. 2016-140958A). In addition, it has been known to attach a sensor to a robot and perform inspection of a workpiece for which a task is performed (e.g., Japanese Unexamined Patent Publication No. 7-98217A).

SUMMARY OF THE INVENTION

A workpiece for which a task is to be performed by a robot apparatus is fixed to a platform or the like. The robot apparatus performs a task while changing a position and an orientation relatively with respect to a part of a workpiece where the task is to be performed. However, the position of the part of the workpiece where the task is to be performed on the platform may be shifted, and thus, the position of the workpiece with respect to a robot may be shifted. For example, a jig for fixing a workpiece to the platform may slightly deform due to aging degradation, or a screw may be loosened. Alternatively, a component made of rubber and included in the jig may degrade or the jig may be abraded. As a result, the position of the workpiece on the platform may be fixed in a state shifted from a desired position.

Alternatively, when the robot apparatus performs welding, spatter generated when the welding is performed may adhere to a surface of the platform. A slight gap may be generated between the platform and the workpiece by the spatter. As a result, the position of the workpiece on the platform may be slightly shifted. Alternatively, in a case where the workpiece is thin, the workpiece may deform due to heat when the welding is performed.

In addition, dimensions of workpieces may be slightly different for each group of components manufactured in a plurality of factories. That is, when a lot of the workpiece is changed, the dimensions of the workpiece may change slightly. Alternatively, due to a manufacturing error of each workpiece, the position of the part of the workpiece where the task is performed may be shifted from the desired position.

When the position at which the robot apparatus performs the task is shifted from the desired position, there is a problem that the quality of the workpiece deteriorates. Therefore, the operator can modify the position of the teaching point and the orientation at the teaching point. However, there are a variety of production methods for manufacturing products. In addition, since many types of components are used, it is difficult for the operator to determine the position or the orientation of the robot that adversely affects the quality of the workpiece. The operator needs experience in order to modify the position or the orientation of the robot.

In the related art, a technique has been known that uses a sensor attached to a robot and corrects a movement path of the robot. However, although the position of the robot can be corrected, there is a problem that the orientation of the robot cannot be corrected. In particular, in arc welding or in applying adhesive, the orientation of the robot (an orientation of an operation tool) with respect to a workpiece greatly affects the quality of the workpiece. For this reason, there is a problem that when the quality of the workpiece is low, it is difficult for the operator to determine whether the position of the robot should be modified or the orientation of the robot should be modified.

Furthermore, a task in which the operator modifies the position or the orientation of the robot is time consuming, and there is a problem that the robot apparatus cannot perform a task during a period of time in which the position or the orientation of the robot is modified.

One aspect of the present disclosure is a controller of a robot apparatus including a robot and an operation tool. The controller includes a correction amount calculating unit configured to calculate a correction amount of a position of the robot at a movement point of a first movement path determined in advance. The controller includes an operation control unit configured to drive the robot in a second movement path obtained by correcting the first movement path based on the correction amount calculated by the correction amount calculating unit. The controller includes a shape detecting sensor configured to detect a shape of a part after the robot apparatus performs a task, and a variable calculating unit configured to calculate a quality variable representing quality of a workpiece based on the shape detected by an output of the shape detecting sensor. The controller includes a determination unit configured to determine a modification method of the position or an orientation of the robot. The determination unit determines that the position or the orientation of the robot needs to be modified based on a correlation between the correction amount of the position of the first movement path and the quality variable when the quality variable deviates from a predetermined determination range.

DETAILED DESCRIPTION

A controller of a robot according to the embodiment will be described with reference to FIG. 1 to FIG. 22. In the present embodiment, a robot apparatus for fixing workpieces by arc welding is exemplified and described.

Figure 1:
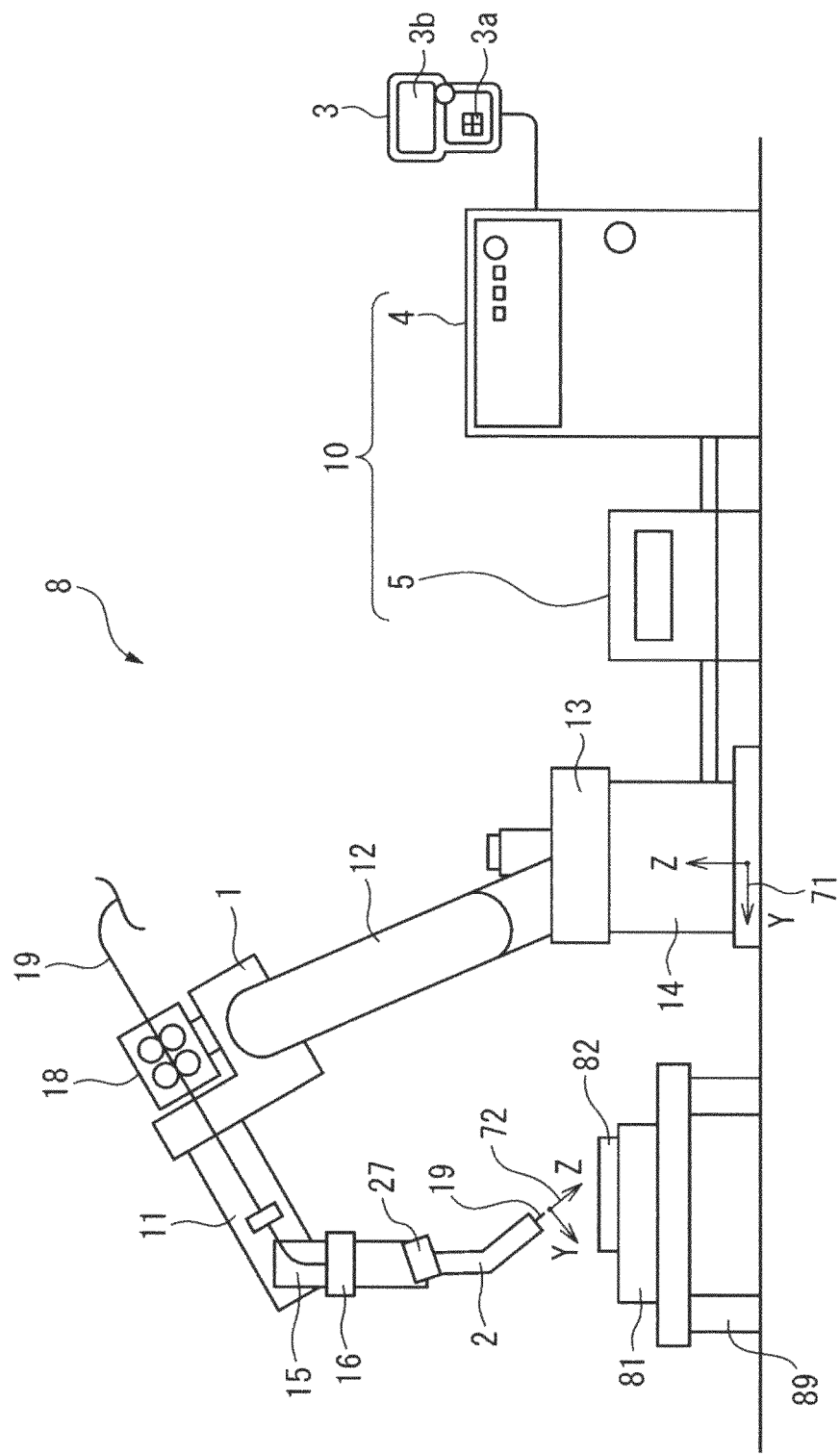
FIG. 1 is a schematic view of a first robot apparatus according to an embodiment.
Figure 2:
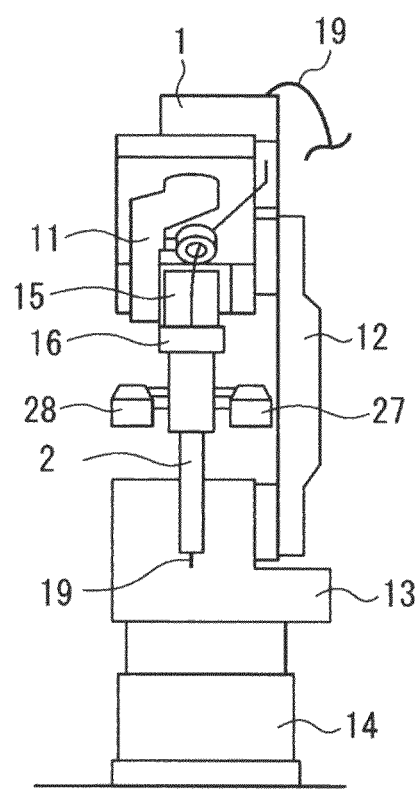
FIG. 2 is a front view of a robot and an operation tool of the first robot apparatus.
Figure 3:
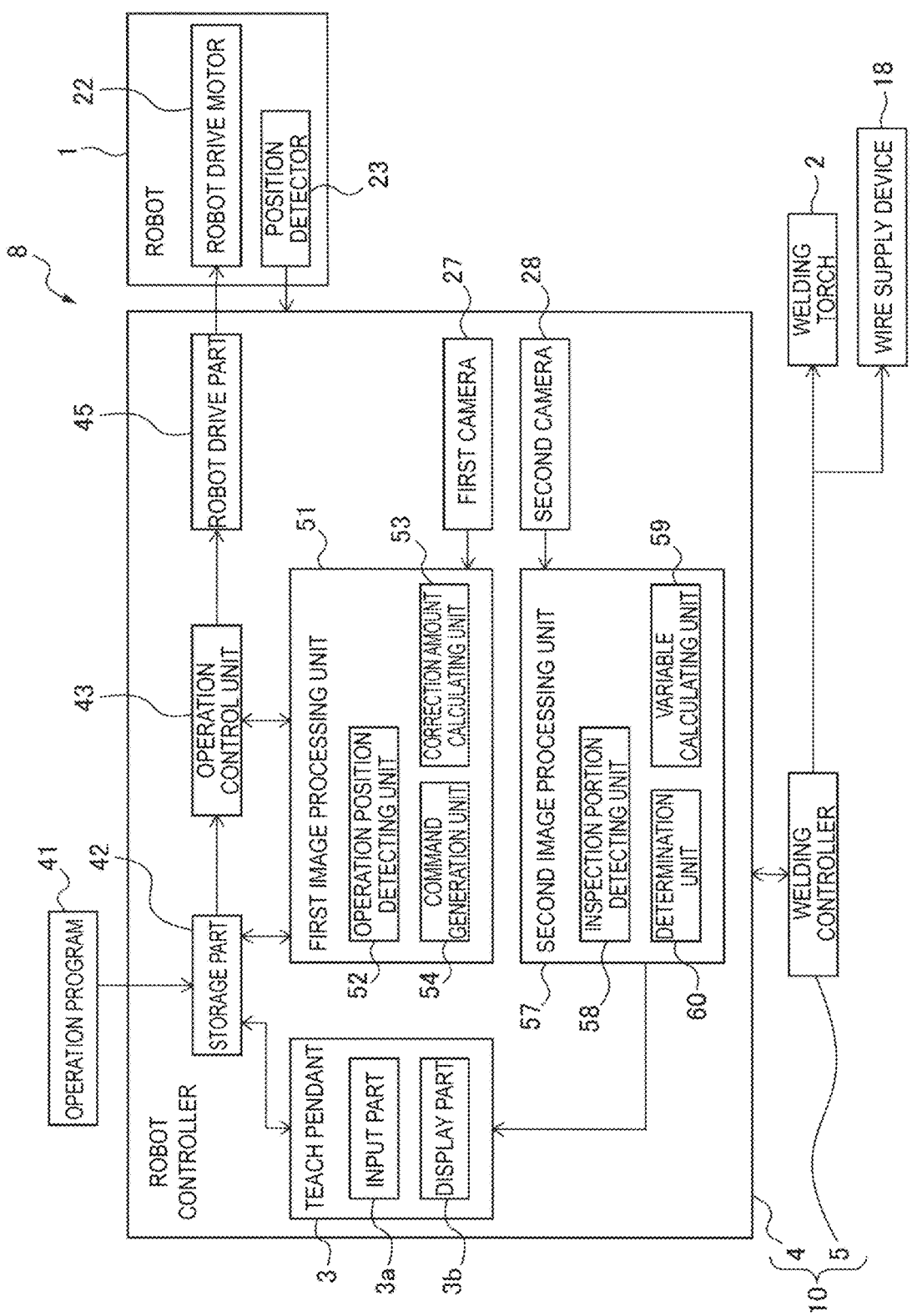
FIG. 3 is a block diagram of the first robot apparatus.

FIG. 1 is a schematic view of a first robot apparatus according to the present embodiment. FIG. 2 is a front view of a robot and a welding torch according to the present embodiment. FIG. 3 is a block diagram of the first robot apparatus according to the present embodiment. With reference to FIG. 1 to FIG. 3, a first robot apparatus 8 includes a welding torch 2 as an operation tool, and a robot 1 that moves the welding torch 2. The robot 1 of the present embodiment is an articulated robot having a plurality of joints.

The robot 1 includes a base 14 and a turning base 13 that is supported by the base 14. The base 14 is fixed on an installation surface. The turning base 13 rotates relative to the base 14. The robot 1 includes an upper arm 11 and a lower arm 12. The lower arm 12 is supported by the turning base 13 via the joint. The upper arm 11 is supported by the lower arm 12 via the joint. The robot 1 includes a wrist 15 that is coupled to an end portion of the upper arm 11. The wrist 15 is supported by the upper arm 11 via the joint. The welding torch 2 is fixed to a flange 16 of the wrist 15.

The robot 1 of the present embodiment includes six drive axes. The robot 1 includes a robot drive device that drives constituent members of the robot 1 such as the upper arm 11. The robot drive device of the present embodiment includes a plurality of robot drive motors 22 for driving the upper arm 11, the lower arm 12, the turning base 13, and wrist 15. Since directions of the constituent members of the robot 1 change at the joints, a position and an orientation of the robot 1 change.

The controller 10 of the robot apparatus 8 includes a robot controller 4 that controls the robot 1. The robot controller 4 includes an arithmetic processing device (computer) including a central processing unit (CPU) as a processor. The arithmetic processing device includes a random access memory (RAM), a read-only memory (ROM), and the like that are connected to the CPU via a bus. The robot 1 is connected to the robot controller 4 via a communication line.

The robot apparatus 8 includes a wire supply device 18 for supplying a wire 19 to the welding torch 2. The wire supply device 18 supplies the wire 19 that is consumed accompanied by performing welding to the welding torch 2. The wire supply device 18 of the present embodiment is fixed to the robot 1.

The controller 10 of the robot apparatus 8 includes a welding controller 5 that controls the welding torch 2 and the wire supply device 18. The welding controller 5 includes an arithmetic processing device including a CPU serving as a processor, a RAM connected to the CPU via a bus, and the like. Additionally, the welding controller 5 includes an electric circuit that supplies electricity to the welding torch 2 and the wire supply device 18. The welding controller 5 is connected to the robot controller 4. The welding controller 5 is formed so as to be able to mutually communicate with the robot controller 4. The welding controller 5 supplies electricity to the welding torch 2 and supplies the wire 19 in response to an operation of the robot 1. The welding controller 5 of the present embodiment is controlled by the robot controller 4.

The robot controller 4 includes a teach pendant 3 for operating the robot controller 4 by the operator. The teach pendant 3 includes an input part 3a for inputting information regarding the robot 1 and the welding torch 2. The input part 3a is configured with a member such as a keyboard and a dial. The teach pendant 3 includes a display part 3b that displays information regarding a control of the robot apparatus 8. The display part 3b is configured with a display panel such as a liquid crystal display panel.

An operation program 41 created in advance for controlling the robot apparatus 8 is input to the robot controller 4. Alternatively, the operator can perform a teaching operation for setting a teaching point of the robot 1 by operating the teach pendant 3 so as to drive the robot 1. The robot controller 4 can create the operation program 41 for the robot 1 and the welding torch 2 based on the teaching points. The robot apparatus 8 performs the welding based on the operation program 41.

The robot controller 4 includes a storage part 42 for storing information related to the control of the robot 1 and the welding torch 2. The storage part 42 can be configured of a storage medium capable of storing information, for example, a volatile memory, a non-volatile memory, a hard disk, or the like. The operation program 41 is stored in the storage part 42.

The robot controller 4 includes an operation control unit 43 that sends an operation command for the robot 1 and the welding torch 2. The operation control unit 43 corresponds to a processor that is driven in accordance with the operation program 41. The operation control unit 43 is formed so as to be able to read information stored in the storage part 42. The processor functions as the operation control unit 43 by reading the operation program 41 and performing the control that is defined in the operation program 41. Alternatively, the processor functions as the operation control unit 43 by driving the robot 1 based on a command from a first image processing unit 51.

The operation control unit 43 sends an operation command for driving the robot 1 to a robot drive part 45. The robot drive part 45 includes an electric circuit that drives the robot drive motor 22. The robot drive part 45 supplies electricity to the robot drive motor 22 based on the operation command. Further, the operation control unit 43 controls an operation of the welding torch 2. The operation controller 43 sends an operation command for driving the welding torch 2 and the wire supply device 18 to the welding controller 5 based on the operation program 41. The welding controller 5 supplies electricity to the welding torch 2 and the wire supply device 18 based on the operation command.

The robot 1 includes a state detector for detecting a position and an orientation of the robot 1. The state detector of the present embodiment includes a position detector 23 attached to the robot drive motor 22. By an output of the position detector 23, the direction of the member of the robot 1 on each drive axis can be acquired. For example, the position detector 23 detects a rotation angle when the robot drive motor 22 is driven. In the present embodiment, based on outputs from a plurality of the position detectors 23, the position and the orientation of the robot 1 are detected.

The controller 10 of the robot apparatus 8 according to the present embodiment includes the robot controller 4 that controls the robot 1, and the welding controller 5 that controls the welding torch 2 and the wire supply device 18, but the embodiment is not limited to this. The robot apparatus 8 may be formed such that one controller controls the robot 1, the welding torch 2, and the wire supply device 18. For example, the robot controller 4 may have a function of the welding controller 5.

A world coordinate system 71 is set in the robot apparatus 8 of the present embodiment. In the example illustrated in FIG. 1, an origin of the world coordinate system 71 is arranged at the base 14 of the robot 1. The world coordinate system 71 is also referred to as a reference coordinate system of the robot 1. The world coordinate system 71 is a coordinate system in which a position of the origin is fixed, and further, directions of coordinate axes are fixed. Even when the position and the orientation of the robot 1 change, a position and a direction of the world coordinate system 71 do not change. The world coordinate system 71 has an X-axis, a Y-axis, and a Z-axis which are orthogonal to each other as coordinate axes. Additionally, a W-axis is set as a coordinate axis around the X-axis. A P-axis is set as a coordinate axis around the Y-axis. An R-axis is set as a coordinate axis around the Z-axis.

In the present embodiment, a tool coordinate system that has an origin which is set at any position of the operation tool is set. An origin of a tool coordinate system 72 according to the present embodiment is set at a tool center point. The tool coordinate system 72 has an X-axis, a Y-axis, and a Z-axis which are orthogonal to each other as coordinate axes. In the example illustrated in FIG. 1, the tool coordinate system 72 has an origin set at a tip point of the wire 19. In addition, the tool coordinate system 72 is set such that an extending direction of the Z-axis is parallel to a direction in which the wire 19 that protrudes from a tip of the welding torch 2 extends. The tool coordinate system 72 has a W-axis around the X-axis, a P-axis around the Y-axis, and an R-axis around the Z-axis.

When the position and the orientation of the robot 1 change, a position of the origin and a direction of the tool coordinate system 72 change. For example, the position of the robot 1 corresponds to a position of the tool center point (the position of the origin of the tool coordinate system 72). Furthermore, the orientation of the robot 1 corresponds to the direction of the tool coordinate system 72 with respect to the world coordinate system 71.

The robot controller 4 includes a first camera 27 as a vision sensor for capturing an image of a part in which the robot apparatus 8 performs a task. The first cameras 27 of the present embodiment is a three-dimensional camera. As the three-dimensional camera, for example, a time of flight (TOF) camera that captures a distance image by a time of flight scheme can be employed. The first camera is not limited to a three-dimensional camera and may be a two-dimensional camera.

The first camera 27 is supported by the robot 1. The first camera 27 of the present embodiment is fixed to a main body portion of the welding torch 2 and moves together with the welding torch 2. The robot controller 4 includes the first image processing unit 51 that processes an image by the first camera 27. The first image processing unit 51 includes an operation position detecting unit 52 that detects a position at which the welding torch 2 performs a task based on the image captured by the first camera 27. The first image processing unit 51 includes a correction amount calculating unit 53 that calculates a correction amount of the position of the robot 1 with respect to a movement point in the first movement path, based on the operation position detected by the operation position detecting unit 52. The first image processing unit 51 includes a command generation unit 54 that sends a command for driving the robot in the second movement path where the first movement path is corrected based on the correction amount calculated by the correction amount calculating unit 53.

Each unit of the first image processing unit 51, the operation position detecting unit 52, the correction amount calculating unit 53, and the command generation unit 54 corresponds to a processor that is driven in accordance with the operation program 41. The processor functions as each unit by reading the operation program 41 and performing the control that is defined by the operation program 41.

The robot controller 4 includes an inspection device that inspects the quality of the part in which the robot apparatus 8 has performed the task. In the present embodiment, a shape of a bead generated by arc welding and a shape of the workpiece around the bead are inspected. The robot apparatus 8 is provided with a shape detecting sensor for detecting a shape of the part after the robot apparatus 8 performs the task. In the present embodiment, a second camera 28 which is a vision sensor is disposed as the shape detecting sensor. The second camera 28 of the present embodiment is a three-dimensional camera. The second camera 28 is supported by the robot 1. In the present embodiment, the second camera 28 is fixed to the main body portion of the welding torch 2 and moves together with the welding torch 2.

Note that the vision sensor as the shape detecting sensor is not limited to the three-dimensional camera, and a two-dimensional camera may be employed. Further, the shape detecting sensor can employ any sensor capable of detecting the shape of the part after the robot apparatus 8 performs the task. For example, a contact sensor or the like that can detect a shape of the workpiece by contacting the workpiece can be employed as the shape detecting sensor.

The robot controller 4 includes a second image processing unit 57 that processes an image captured by the second camera 28. The second image processing unit 57 includes an inspection portion detecting unit 58 that detects a portion on which an inspection is performed based on the image captured by the second camera 28. The second image processing unit 57 includes a variable calculating unit 59 that calculates a quality variable representing the quality of the workpiece based on the shape detected by the output of the second camera 28. In the present embodiment, as will be described below, a bead width of welding, an undercut depth, and the like correspond to the quality of the workpiece.

The second image processing unit 57 includes a determination unit 60 that determines a modification method of a position or an orientation of the robot based on a correlation between a correction amount of a position in the first movement path and a quality variable. A determination result by the determination unit 60 is displayed on the display part 3b of the teach pendant 3.

Each unit of the second image processing unit 57, the inspection portion detecting unit 58, the variable calculating unit 59, and the determination unit 60 corresponds to a processor that is driven in accordance with the operation program 41. The processor functions as each unit by reading the operation program 41 and performing the control that is defined by the operation program 41.

Figure 4:
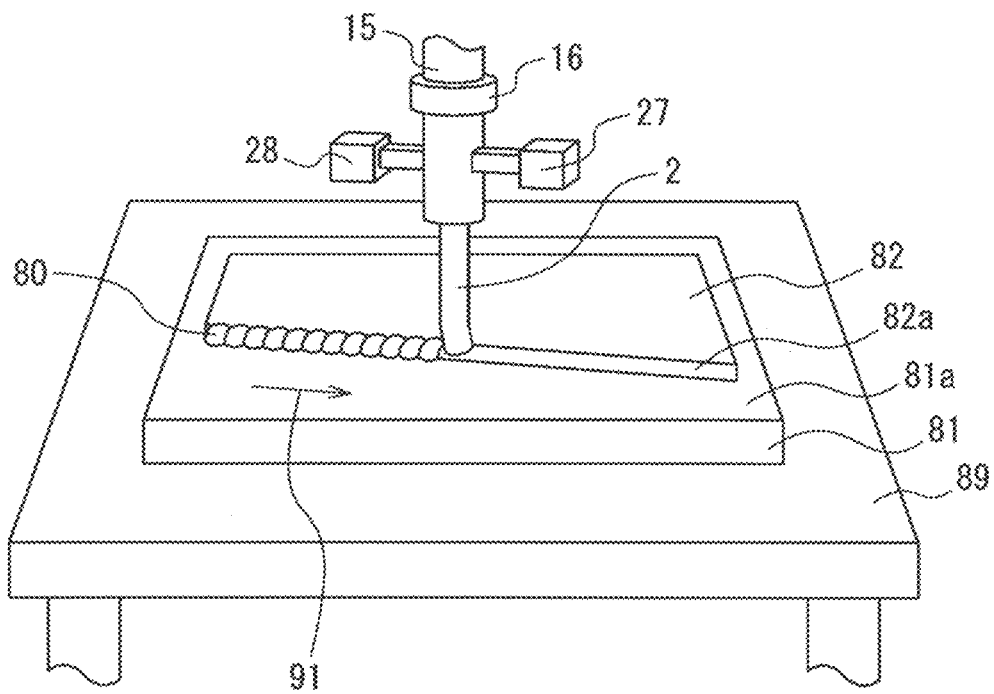
FIG. 4 is an enlarged perspective view of workpieces and a welding torch when arc welding is performed by the first robot apparatus.

FIG. 4 illustrates an enlarged perspective view of workpieces and the welding torch when welding is performed by the first robot apparatus according to the present embodiment. In the present embodiment, a workpiece 81 is fixed on a top face of a platform 89. A workpiece 82 is disposed on a top face 81a of the workpiece 81. The workpieces 81 and 82 illustrated in FIG. 4 are plate-like members. The workpieces 81 and 82 are fixed on the platform 89 by a jig which is not shown in the figures. The robot apparatus 8 fixes an end face 82a of the workpiece 82 to the top face 81a of the workpiece 81 by welding. As illustrated by an arrow 91, the robot controller 4 changes the position and the orientation of the robot 1 such that the welding torch 2 moves along the end face 82a. In the present embodiment, the welding is performed while the position of the robot 1 is corrected based on an image captured by the first camera 27.

Figure 5:
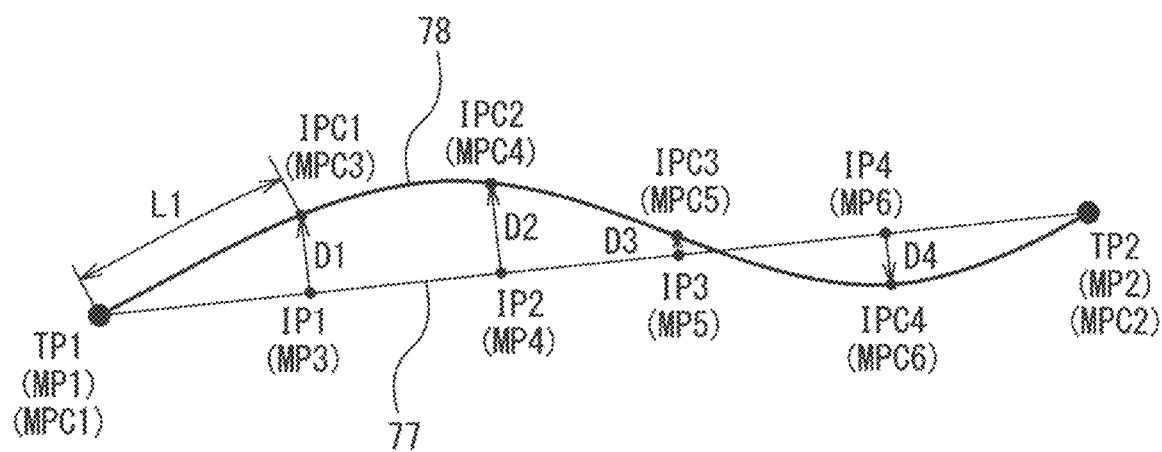
FIG. 5 is a diagram illustrating a movement path before correction and a movement path after correction of the robot.

FIG. 5 illustrates a movement path before correction and the movement path after correction of the position of the robot. The movement path corresponds to, for example, a path through which the tool center point passes. With reference to FIG. 4 and FIG. 5, a teaching point TP1 at which welding is started and a teaching point TP2 at which the welding is ended are set in the operation program 41. The movement path before correction of the position of the robot 1 is a first movement path 77. The first movement path 77 is a movement path based on the operation program 41. The first movement path 77 extends from the teaching point TP1 toward the teaching point TP2. The first movement path 77 is corrected based on the image captured by the first camera 27 and a second movement path 78 is generated as the movement path after correction.

Figure 6:
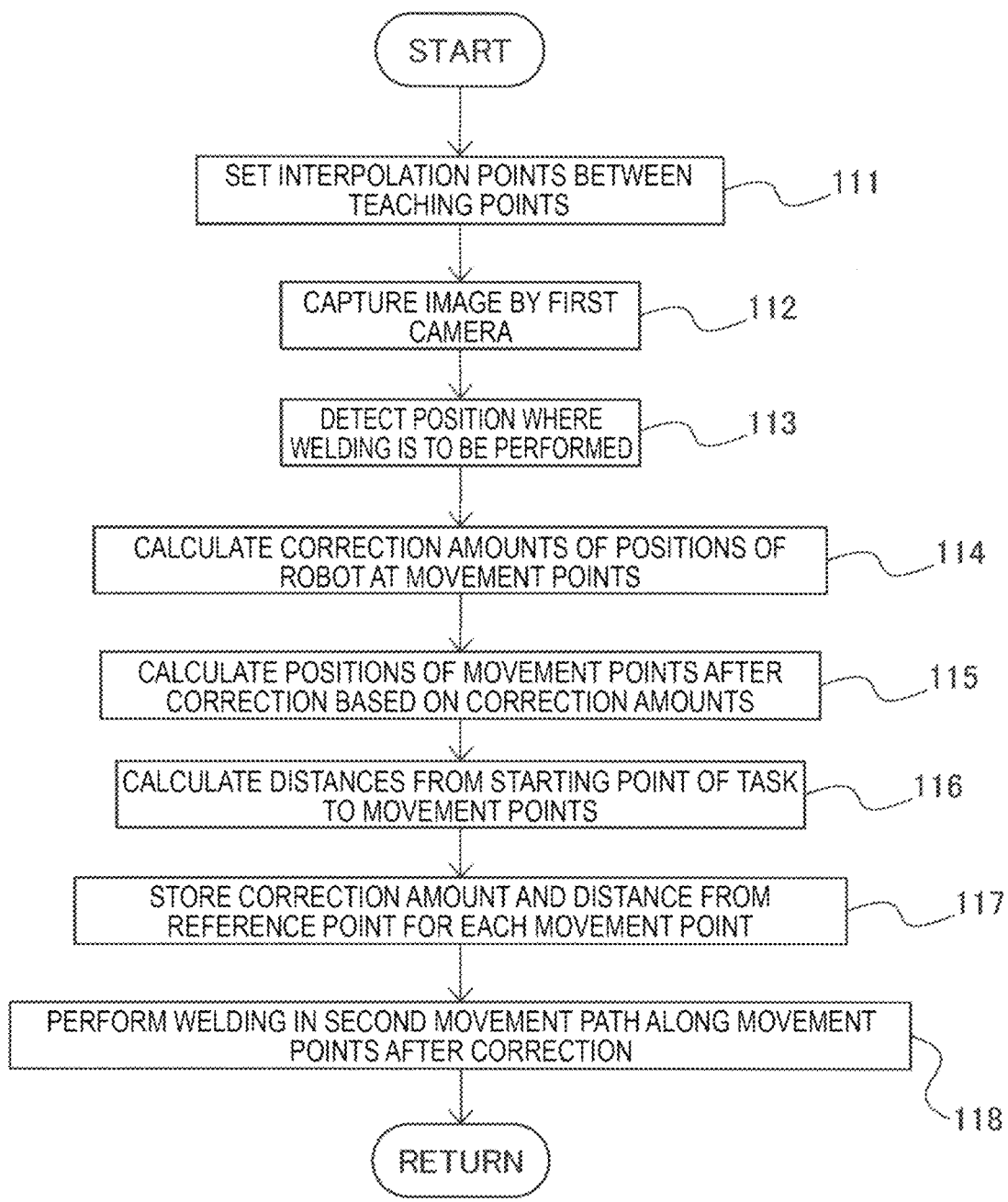
FIG. 6 is a flowchart of a control for performing welding by the first robot apparatus.

FIG. 6 illustrates a flowchart of a control when welding is performed by the first robot apparatus. With reference to FIG. 3 to FIG. 6, when the robot apparatus 8 starts the control for performing welding, in step 111, the operation control unit 43 acquires the teaching points TP1 and TP2 from the operation program 41. The operation control unit 43 sets a plurality of interpolation points between the teaching point TP1 and the teaching point TP2. The interpolation points are set along the first movement path 77. The interpolation points can be set for each predetermined distance, for example. In the example illustrated in FIG. 5, interpolation points IP1, IP2, IP3, and IP4 are illustrated among many interpolation points set between the teaching point TP1 and the teaching point TP2. Note that, in the present embodiment, the teaching point and the interpolation point are collectively referred to as a "movement point". In FIG. 5, movement points MP1 to MP6 before correction are illustrated in the first movement path 77. For example, the movement point MP1 corresponds to the teaching point TP1, and the movement point MP3 corresponds to the interpolation point IP1.

In step 112, the first camera 27 captures an image of a part where welding is performed. In the present embodiment, the first camera 27 captures an image including the end face 82a of the workpiece 82 and the top face 81a of the workpiece 81. The first image processing unit 51 acquires the image by the first camera 27.

In step 113, the operation position detecting unit 52 of the first image processing unit 51 detects a position at which welding of the workpieces 81 and 82 is performed. The operation position detecting unit 52 detects a line on which the end face 82a of the workpiece 82 and the top face 81a of the workpiece 81 contact with each other in the image captured by the first camera 27. For example, reference images of the workpieces 81 and 82 can be generated in advance. By using the reference image and the actually captured image, the operation position detecting unit 52 can detect the line on which the end face 82a of the workpiece 82 and the top face 81a of the workpiece 81 contact with each other by a template matching method.

Since the first camera 27 of the present embodiment is a three-dimensional camera, a distance from the first camera to a portion included in the image is detected. The first camera 27 is calibrated so that the actual position can be detected based on a position in a screen coordinate system in the image and the distance from the first camera 27. The operation position detecting unit 52 can detect a three-dimensional position of the line on which the end face 82a of the workpiece 82 and the top face 81a of the workpiece 81 contact with each other. In other words, the operation position detecting unit 52 can detect a three-dimensional position of the part where welding is to be performed. In the present embodiment, the tool center point is disposed near the line where the top face 81a of the workpiece 81 and the end face 82a of the workpiece 82 contact with each other.

Next, in step 114, the correction amount calculating unit 53 calculates correction amounts of positions of the movement points MP1 to MP6 based on the position of the robot 1 at each of the movement points and the position of the part where the welding is to be performed. In the example illustrated in FIG. 5, correction amounts D1 to D4 are calculated based on the images captured by the first camera 27 for the respective movement points MP3 to MP6 (interpolation points IP1 to IP4). Note that the correction amounts of the positions at the movement point MP1 (the teaching point TP1) at which the welding is to be started and the movement point MP2 (the teaching point TP2) at which the welding is to be ended are zero. A movement point MPC1 after correction is at the same position as the movement point MP1 before correction. In addition, a movement point MPC2 after correction is at the same position as the movement point MP2 before correction.

In step 115, the correction amount calculating unit 53 calculates positions of interpolation points IPC1 to IPC4 after correction (movement points MPC3 to MPC6 after correction) based on the correction amounts D1 to D4. A movement path based on the movement points MPC1 to MPC6 after correction corresponds to the second movement path 78 after correction.

In step 116, the correction amount calculating unit 53 calculates a distance L from a predetermined reference point at each of the movement points MPC2 to MPC6 after correction. In the present embodiment, the correction amount calculating unit 53 calculates the distance L from the movement point MPC1 which is a starting point of a task. The correction amount calculating unit 53 calculates the distance L along the second movement path 78. In the example illustrated in FIG. 5, a distance L1 from the movement point MPC1 to the movement point MPC3 after correction is illustrated. Similarly, distances L2, L3, L4, and L5 from the movement point MPC1 are respectively calculated for the movement points MPC4, MPC5, and MPC6, and the movement point MPC2 after correction.

In step 117, the storage part 42 stores the correction amounts D1 to D4 of the position of the robot 1 and the distances L1 to L5 from the reference point. The storage part 42 stores, for each of the movement points MPC1 to MPC6 after correction, the correction amount D of the position and the distance L from the reference point in combination. In other words, the storage part 42 stores the correction amount D as a function of the distance L.

Next, in step 118, the command generation unit 54 sends a command for changing the position of the robot 1 based on the positions of the movement points MPC1 to MPC6 after correction. The command generation unit 54 generates an operation command for the robot 1 so that the tool center point moves along the second movement path 78 after correction. The operation control unit 43 drives the robot 1 in the second movement path 78 where the first movement path 77 is corrected based on the correction amounts calculated by the correction amount calculating unit 53. The operation control unit 43 performs the welding while driving the robot 1.

In this case, the welding can be performed without changing the orientation of the robot 1. The orientation of the robot 1 at the movement points MP1 to MP6 before correction can be adopted as the orientation of the robot 1 at the respective movement points MPC1 to MPC6 after correction. For example, the orientation of the robot 1 at the movement point MP3 can be adopted as the orientation of the robot 1 at the movement point MPC3.

In this way, the robot controller 4 calculates a shift of the movement path with respect to the actual position at which the workpiece is to be processed by processing the image captured by the first camera 27. The robot controller 4 performs the welding while modifying the position of the robot 1 based on the shift of the movement path.

Figure 7:
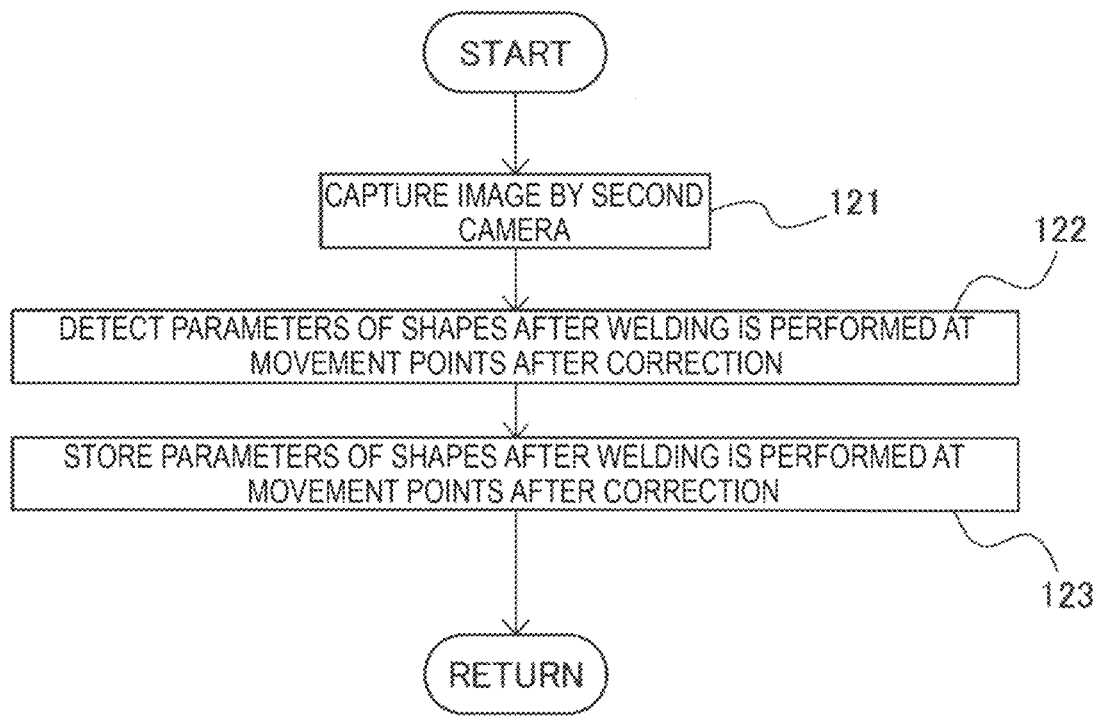
FIG. 7 is a flowchart of a control for acquiring parameters related to a shape of the workpiece after the welding.

FIG. 7 illustrates a flowchart of a control for acquiring parameters of an inspection that is performed together with the welding. With reference to FIG. 3, FIG. 4, and FIG. 7, in step 121, an image of a bead 80, and the workpieces 81 and 82 after the welding is performed is captured by the second camera 28. The second camera 28 captures an image of a part after the robot apparatus 8 performs a task. The inspection portion detecting unit 58 of the second image processing unit 57 detects a portion where an inspection is to be performed in the image captured by the second camera 28. For example, the inspection portion detecting unit 58 detects the inspection portion in the image based on a reference image created in advance of the inspection portion. In the present example, the inspection portion detecting unit 58 detects the bead 80 and a region around the bead 80.

In step 122, the inspection portion detecting unit 58 detects parameters of shapes of the bead 80 and the workpieces 81 and 82 at the movement points MPC1 to MPC6 after correction. Here, the parameters of the shapes of the bead 80 and the workpieces 81 and 82 for evaluating the quality of the workpieces 81 and 82 after the welding is performed will be described.

Figure 8:
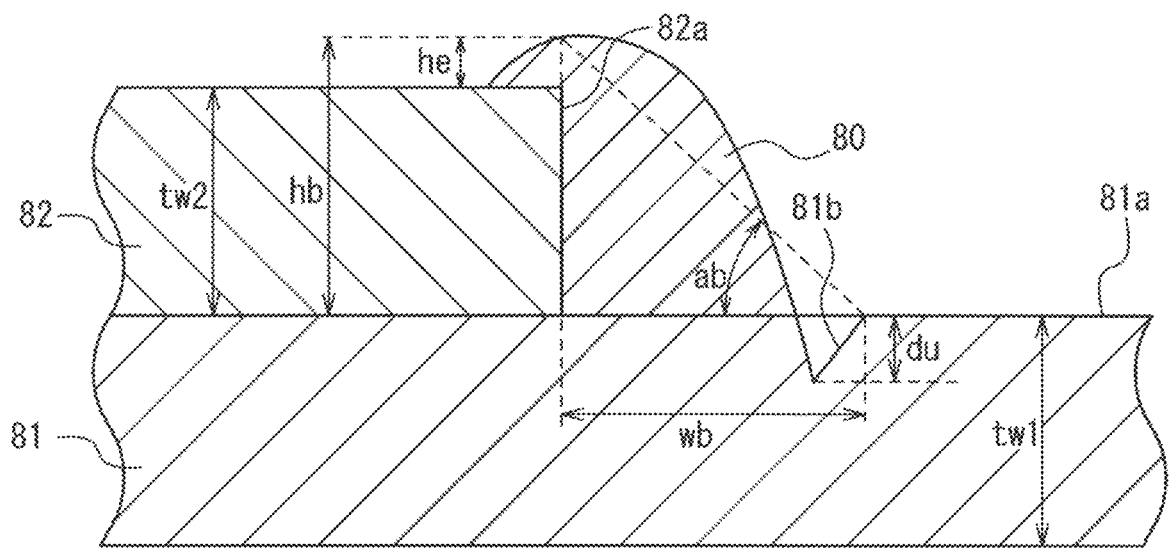
FIG. 8 is a schematic cross-sectional view of workpieces for describing parameters for inspecting quality of the workpieces.

FIG. 8 illustrates an enlarged cross-sectional view of the workpieces and the bead after the welding is performed. The parameters related to the quality of the workpieces 81 and 82 after the welding is performed are illustrated in FIG. 8. The second camera 28 of the present embodiment is a three-dimensional camera. Accordingly, various dimensions related to the part where the welding is performed can be detected.

A thickness tw1 of the workpiece 81 and a thickness tw2 of the workpiece 82 are measured in advance. A height hb of the bead is included in the parameters for determining the quality of the welding. The height hb of the bead can be calculated by a difference between a position of the highest point on a surface of the bead 80 and a position of a point on the top face 81a of the workpiece 81. Excess weld metal he is included in the parameters for determining the quality. The excess weld metal he can be calculated by subtracting the thickness tw2 of the workpiece 82 from the height hb of the bead. The excess weld metal is preferably approximately 10% of the thickness tw2 of the second workpiece 82, for example. Further, a width wb of the bead is included in the parameters for evaluating the quality. The width wb of the bead is preferably about the same as the thickness tw2 of the workpiece 82. Also, an angle ab related to the bead 80 is preferably approximately 45°.

When arc welding is performed, an undercut 81b may be formed in the workpiece 81. A depth du of the undercut 81b can be calculated by a difference between a position of the deepest point of the undercut 81b and a position of a point on the top face 81a of the workpiece 81. The depth du of the undercut 81b is preferably small. In other words, the depth du of the undercut 81b is preferably zero.

Figure 9:
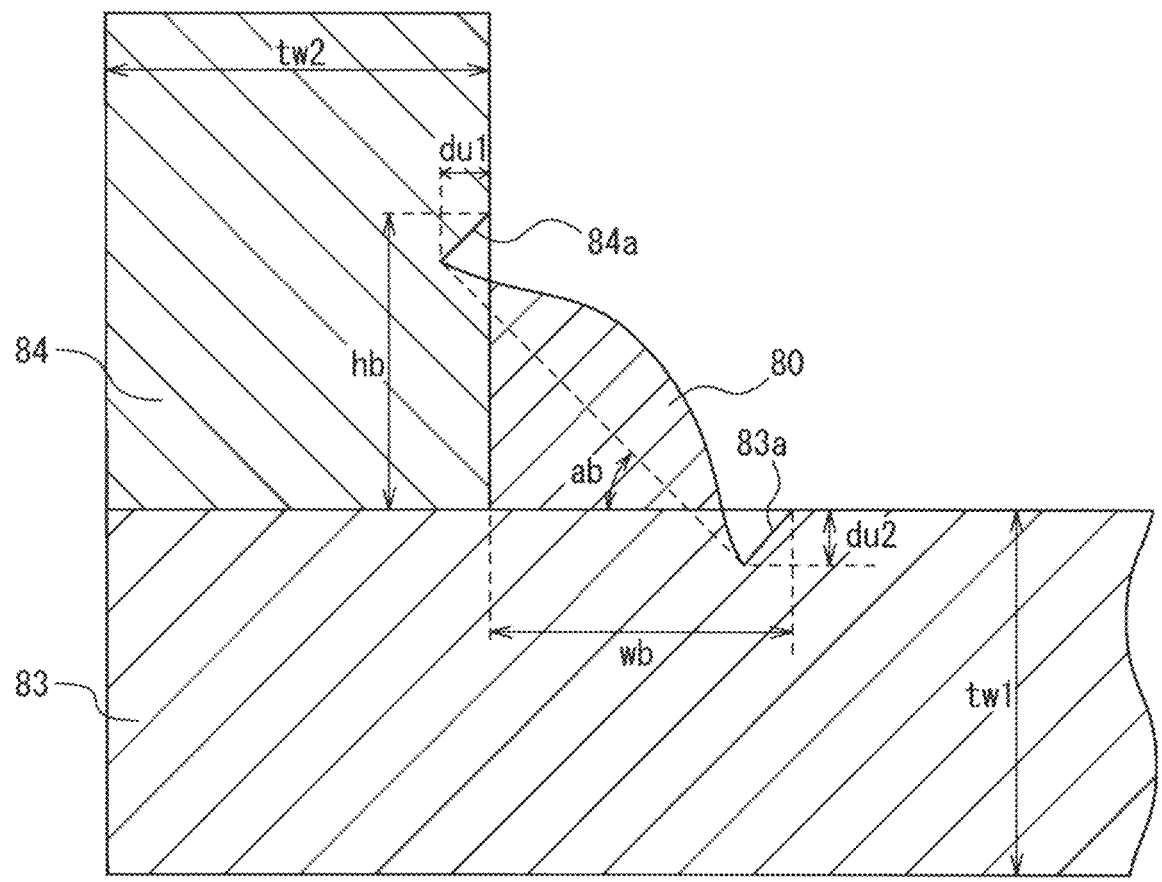
FIG. 9 is a schematic cross-sectional view of other workpieces for describing parameters for inspecting quality of the workpieces.

FIG. 9 illustrates an enlarged cross-sectional view of other workpieces and a bead after welding is performed. FIG. 9 illustrates a cross-sectional view in a case in which workpieces 83 and 84 having a plate-like shape are thick and fillet welding is performed. When the fillet welding is performed, an undercut 83a may be formed in the workpiece 83, and an undercut 84a may be formed in the workpiece 84. In such a case, the height hb of the bead, the width wb of the bead 80, depths du1 and du2 of the undercuts 83a and 84a, the angle ab of the bead, and the like can be detected.

With reference to FIG. 7, in step 122, the inspection portion detecting unit 58 detects the parameters of the shapes related to the quality of the workpieces as illustrated in FIG. 8 and FIG. 9. In step 123, the storage part 42 stores the parameters of the shapes at the movement points MPC1 to MPC6 after correction.

Figure 10:
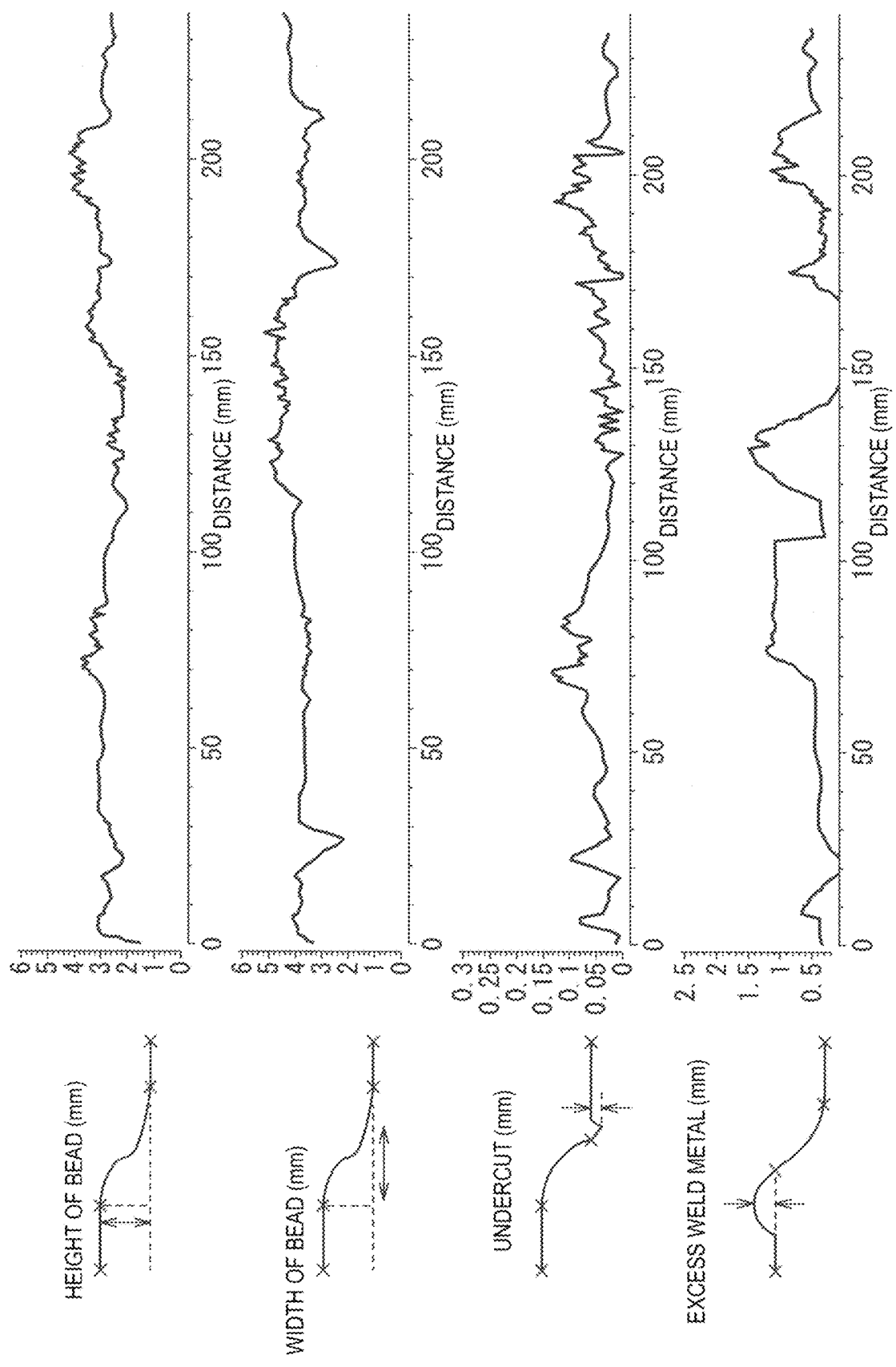
FIG. 10 is graphs of inspection results of parameters when quality of a workpiece is inspected.

FIG. 10 illustrates an example of a graph of the parameters detected by the inspection portion detecting unit. FIG. 10 illustrates an image displayed on the display part 3b of the teach pendant 3. As parameters for inspecting the quality, the height of the bead, the width of the bead, the depth of the undercut, and the excess weld metal are illustrated. Magnitudes of the parameters with respect to the distance L from the movement point MPC1 as the reference point are illustrated. The robot controller 4 changes the position and the orientation of the robot 1 so that the parameters at all movement points MPC1 to MPC6 can be measured. In this way, the inspection portion detecting unit 58 can detect the magnitudes of the parameters at each of the movement points MPC1 to MPC6.

(First Control for Determining Modification Method of Position or Orientation of Robot)

Figure 11:
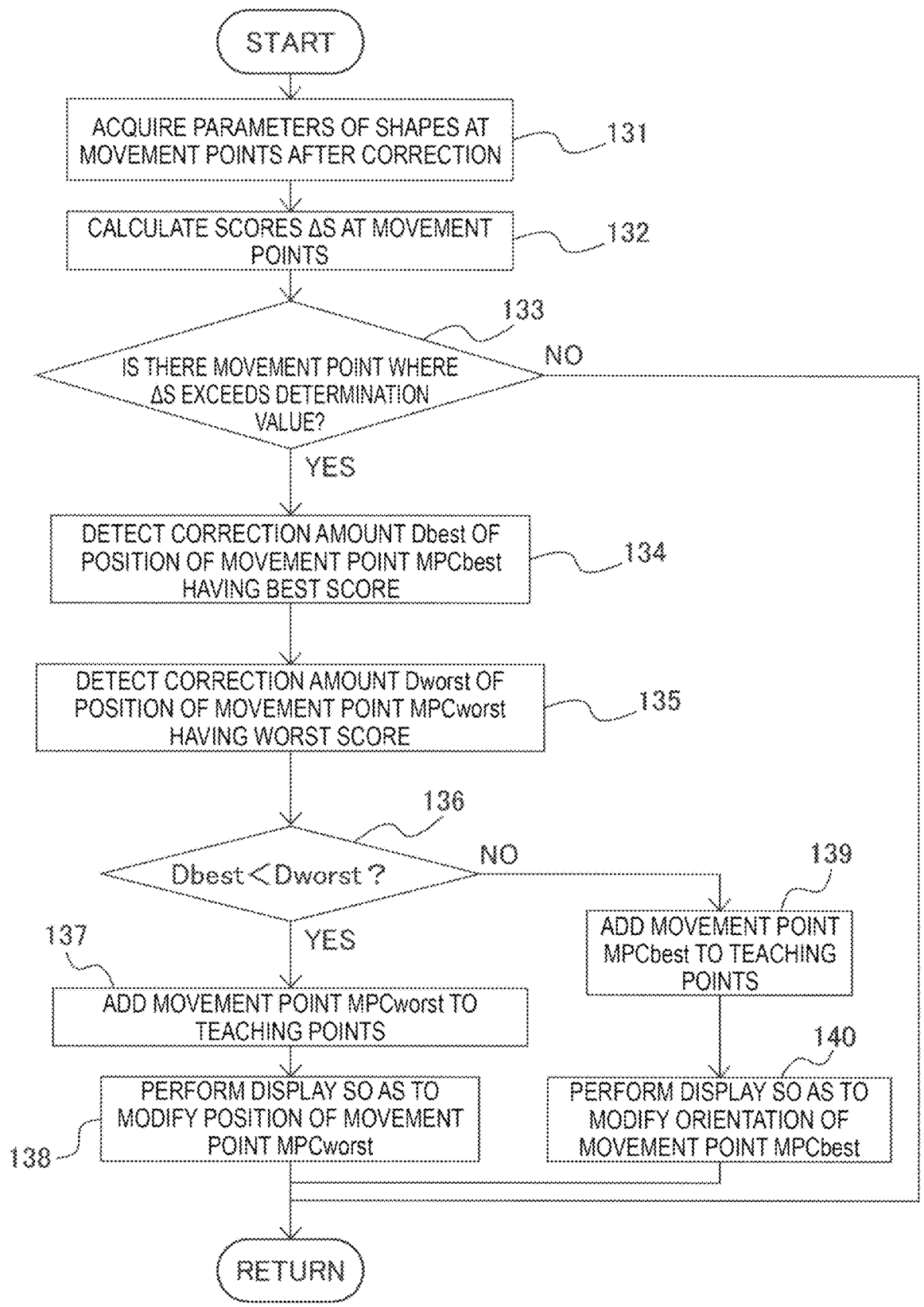
FIG. 11 is a flowchart of a first control for determining a modification method of a position or an orientation of the robot.

FIG. 11 is a flowchart of a first control for determining a modification method of the position or the orientation of the robot. With reference to FIG. 3, FIG. 5, and FIG. 11, the variable calculating unit 59 of the second image processing unit 57 calculates a quality variable representing the quality of the workpieces after the welding is performed based on the parameters of the shapes detected from the image captured by the second camera 28.

In step 131, the variable calculating unit 59 acquires the parameters of the shapes at the movement points MPC1 to MPC6 after correction. In step 132, the variable calculating unit 59 calculates a score ΔS as the quality variable representing the quality of the workpieces 81 and 82 at each of the movement points MPC1 to MPC6.

In the present embodiment, the score ΔS for simultaneously evaluating a plurality of parameters is calculated. For example, when the thin workpieces 81 and 82 are welded as illustrated in FIG. 8, a variable S can be calculated as will be represented in Equation (1) below.

$$S = C \frac{(tw1 - du)}{tw1} + (1 - C) \frac{hb}{tw2} \quad (1)$$

Here, a coefficient C is a weight that the operator sets according to importance. A value larger than 0 and smaller than 1 may be employed as the coefficient C. In Equation (1), evaluation is performed on the height hb of the bead and the depth du of the undercut. The height hb of the bead is preferably close to the thickness tw2 of the second workpiece 82. Alternatively, the depth du of the undercut is preferably zero. As a result, it can be determined that the closer to 100% the variable S is, the better the quality of the workpieces after the welding is performed is.

In addition, as illustrated in FIG. 9, in a case where the fillet welding is performed on the thick workpieces 83 and 84, the variable S can be calculated as will be represented in Equation (2) below.

$$S = \frac{1}{2} \frac{hb}{tw2} + \frac{1}{2} \frac{wb}{tw1} \quad (2)$$

In Equation (2), evaluation is performed on the height hb of the bead and the width wb of the bead. When the workpieces 83 and 84 are thick, the depths du1 and du2 of the undercuts are not problematic, and therefore, the variable S for evaluating the height hb of the bead and the width wb of the bead can be adopted. Similarly to Equation (1), the closer to 100% the variable S is, the better the quality of the workpieces after the welding is performed is.

Next, in the present embodiment, the score ΔS can be calculated as will be represented in Equation (3) below, based on the variable S.

$$\Delta S = |100 - S| \quad (3)$$

The score ΔS indicates the quality of the workpieces. It can be determined that the smaller the score ΔS is, the better the quality of the workpieces is. The score ΔS can be calculated for each of the movement points MPC1 to MPC6 after correction. Also, the score ΔS can be calculated as a function of the distance L.

Note that the score ΔS as the quality variable is not limited to the above-described embodiment, and any parameter of the shapes can be set. Also, as the quality variable, one parameter of the shapes that represents the quality of welding may be chosen. For example, regarding the width of the bead, a reference value that is the best width of the bead can be set. Then, the quality variable may be calculated based on a difference between the actually measured width of the bead and the reference value.

Next, the determination unit 60 of the second image processing unit 57 determines the modification method of the position or the orientation of the robot 1 based on the correlation between each of the correction amounts D1 to D4 of the positions in the first movement path 77 and the score ΔS.

In step 133, the determination unit 60 determines whether or not there is the movement point where the quality variable deviates from a predetermined determination range. The determination unit 60 determines whether there is the movement point where the quality of the workpieces 81 and 82 is bad. In the present embodiment, the determination unit 60 determines whether or not there is the movement point where the score ΔS exceeds a predetermined determination value, among the movement points MPC1 to MPC6. The determination value of the score ΔS can be predetermined.

In step 133, when the scores ΔS are lower than or equal to the determination value for all movement points MPC1 to MPC6, the control is ended. In other words, in a case where there is no movement point where the quality of the workpieces 81 and 82 is bad, this control is ended. In step 133, when there is the movement point where the score ΔS exceeds the determination value, among the movement points MPC1 to MPC6, the control proceeds to step 134.

The determination unit 60 extracts the best movement point that is the movement point at which the quality variable is the best in the second movement path 78 and the worst movement point that is the movement point at which the quality variable is the worst. In step 134, the determination unit 60 detects a movement point MPCbest at which the score ΔS is the best among a plurality of movement points MPC1 to MPC6. In the present embodiment, the determination unit 60 detects the movement point at which the score ΔS is the smallest. Additionally, the determination unit 60 detects a correction amount Dbest at the movement point MPCbest at which the score ΔS is the best.

In step 135, the determination unit 60 detects a movement point MPCworst at which the score ΔS is the worst among the plurality of movement points MPC1 to MPC6. In the present embodiment, the determination unit 60 detects the movement point at which the score ΔS is the largest. Additionally, the determination unit 60 detects a correction amount Dworst at the movement point MPCworst at which the score ΔS is the worst.

In step 136, the determination unit 60 compares a magnitude of the correction amount Dbest to a magnitude of the correction amount Dworst. In the first control of the present embodiment, in a case where the correction amount of the position that greatly affects the score ΔS is small, the correction of the position is determined to be the main cause of deterioration of the score. In this case, it can be determined that the modification of the position in the second movement path is required. On the other hand, even though the correction of the position is performed, in a case where the score ΔS is excellent, the influence of the position of the robot is determined to be small. In this case, it can be determined that the orientation of the robot in the second movement path needs to be modified.

In step 136, when the correction amount Dbest is smaller than the correction amount Dworst, the control proceeds to step 137. In step 137, the determination unit 60 adds the movement point MPCworst to the teaching points. In a case where the movement point MPCworst has already been the teaching point, the control proceeds to step 138.

In step 138, the determination unit 60 sends, to the teach pendant 3, a command for performing display so as to modify the position at the movement point MPCworst. The display part 3b of the teach pendant 3 performs display so as to modify the position at the movement point MPCworst as the newly added teaching point. In other words, the display part 3b displays a screen for proposing the modification of the position of the robot 1.

On the other hand, in step 136, when the correction amount Dbest is equal to or larger than the correction amount Dworst, the control proceeds to step 139. In step 139, the determination unit 60 adds the movement point MPCbest to the teaching points. In a case where the movement point MPCbest has already been the teaching point, the control proceeds to step 140.

In step 140, the determination unit 60 sends, to the teach pendant 3, a command for performing display so as to modify the orientation at the movement point MPCbest. The display part 3b of the teach pendant 3 performs display so as to modify the orientation at the movement point MPCbest as the newly added teaching point. In other words, the display part 3b displays a screen for proposing the modification of the orientation of the robot 1. The operator can view the screen of the display part 3b and consider the modification of the position or the orientation of the robot 1.

Figure 12:
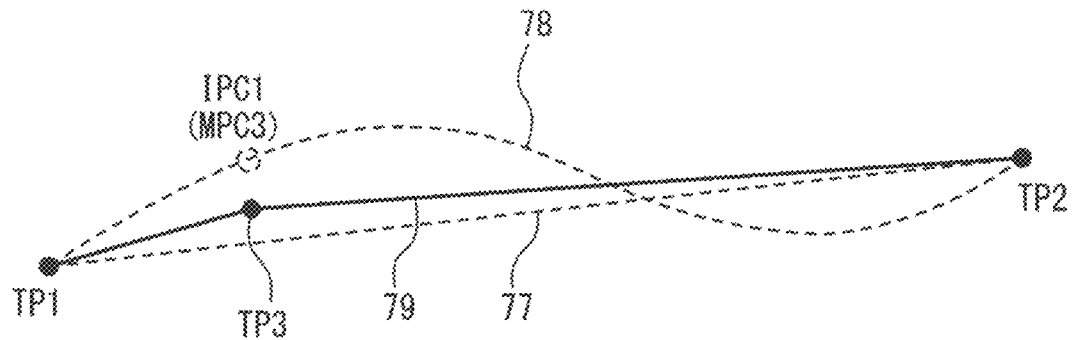
FIG. 12 is a diagram of the movement path after a position of a movement point is modified based on a determination result by a determination unit.

FIG. 12 illustrates the movement path when the position of the robot at the teaching point added by the determination unit is modified. In the example here, as the movement point at which the position is to be modified, the movement point MPC3 after correction is set as the teaching point TP3. The position of the teaching point TP3 is then modified by the operator. The robot apparatus 8 sets the movement path through the teaching points TP1, TP2, and TP3 as a first movement path 79 when the next workpieces 81 and 82 are welded. The operation control 43 then sets interpolation points in a section between the teaching point TP1 and the teaching point TP3, and a section between the teaching point TP3 and the teaching point TP2. The correction amount calculating unit 53 calculates the correction amount of the position of the robot 1 based on an image captured by the first camera 27 and the first movement path 79, and sets the second movement path. In this way, the same control as that described above can be repeated.

In the first control of the present embodiment, when the correction amount at the best movement point that has the best score is smaller than the correction amount at the worst movement point that has the worst score, it is determined that the position of the robot needs to be modified. On the other hand, when the correction amount at the best movement point that has the best score is larger than the correction amount at the worst movement point that has the worst score, the determination unit determines that the orientation of the robot needs to be modified. Then, the display part can display a screen for proposing the modification of the position or the orientation of the robot.

In the control of the present embodiment, the modification method of the teaching point is determined based on a correlation between the correction amount of the position in the movement path and the quality variable. Accordingly, the position or the orientation of the robot can be appropriately modified regardless of the experience or skill of the operator. In addition, the teaching points can be modified in a short period of time, as compared to a case where the position or the orientation of the robot is modified based on the experience of the operator.

The modification of the teaching point in the present embodiment can be performed by stopping a task being performed by the robot apparatus during a period of time when a product is being manufactured. For example, when the screen proposing the modification of the position or the orientation of the robot is displayed, the movement point of the present embodiment can be modified. Alternatively, in a case where the lot of the workpiece changes, the movement point in the present embodiment may be modified.

In the first robot apparatus 8 according to the present embodiment, the first movement path 77 of the robot 1 is corrected based on the image captured by the first camera 27, but the embodiment is not limited to this. Any sensor can be used in order to correct the first movement path of the robot. Alternatively, the first movement path of the robot can be corrected without using a sensor.

Figure 13:
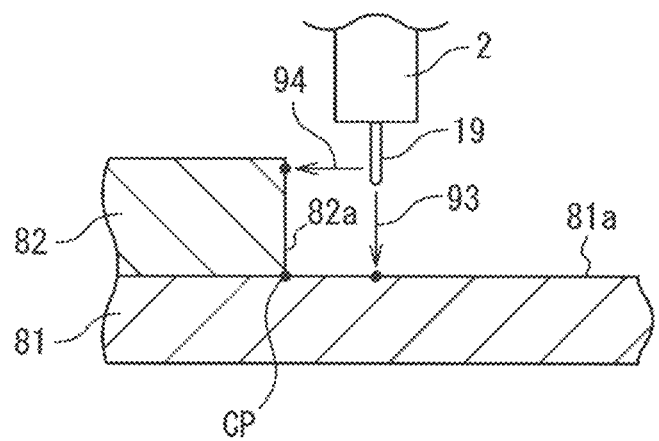
FIG. 13 is a schematic view of workpieces and a welding torch for describing a control for calculating a path after correction before welding is performed.

FIG. 13 illustrates an enlarged partial cross-sectional view of workpieces and the welding torch for describing the control for correcting the first movement path of the robot. FIG. 13 illustrates a state before welding is performed. The top face 81a of the workpiece 81 is disposed so as to extend in a horizontal direction. In addition, the end face 82a of the workpiece 82 is disposed so as to extend in a vertical direction. The operation control unit 43 controls the position and the orientation of the robot 1 such that the wire 19 protruding from the welding torch 2 is disposed in a vicinity of a part where the welding is performed. The welding controller 5 applies a small voltage to the wire 19.

The operation control unit 43 changes the position and the orientation of the robot 1 so that the welding torch 2 moves in a direction indicated by an arrow 93. When the wire 19 contacts the top face 81a of the workpiece 81, a small current flows. A position of a tip of the wire 19 at this time (a position of the tool center point) corresponds to a position of the top face 81a of the workpiece 81. The robot controller 4 can detect the position of the top face 81a of the workpiece 81.

Next, the operation control unit 43 returns the welding torch 2 to the original position. The welding controller 5 applies a small voltage to the wire 19. The operation control unit 43 changes the position and the orientation of the robot 1 so that the wire 19 is directed toward the end face 82a of the workpiece 82, as indicated by an arrow 94. When the wire 19 contacts the end face 82a of the workpiece 82, a small current flows. The position of the tip of the wire 19 at this time corresponds to a position of the end face 82a of the workpiece 82. The robot controller 4 can detect the position of the end face 82a of the workpiece 82.

Based on the position of the top face 81a of the workpiece 81 and the position of the end face 82a of the workpiece 82, the robot controller 4 can detect a position of a point CP where the workpiece 82 contacts the workpiece 81. Then, by correcting the first movement path based on the position of the point CP, the second movement path can be generated. The same value can be applied to the correction amount of the movement path from the starting point of the welding to the ending point of the welding. One correction amount can be applied to the entire movement path. In this way, the robot controller 4 can detect the position at which the robot apparatus performs the task without using a vision sensor.

Figure 14:
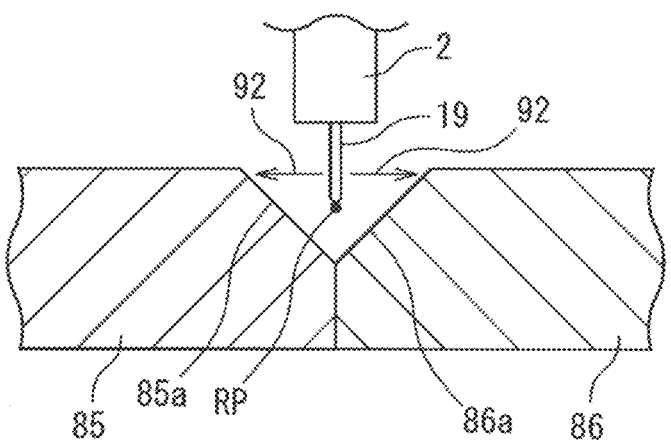
FIG. 14 is a schematic view of workpieces and the welding torch for describing a control for calculating a path after correction during a period of time in which the welding is being performed.

FIG. 14 illustrates an enlarged partial cross-sectional view of workpieces and the welding torch for describing another control for correcting the first movement path of the robot. In the example illustrated in FIG. 14, a workpiece 85 having a cutout 85a and a workpiece 86 having a cutout 86a are to be fixed by welding. The cutout 85a and the cutout 86a form a recess whose cross-sectional shape is a V-shape. The welding torch 2 moves along a direction in which the recess extends. A bead is formed inside the recess.

In addition, the welding torch 2 performs welding while moving back and forth as indicated by an arrow 92 inside the recess. In other words, the robot apparatus performs welding while performing weaving. The weaving is a method of performing welding while vibrating the welding torch, for example, in a direction perpendicular to a direction in which a part where the welding is performed extends. The weaving is suitable when an amount of bead is large.

Figure 15:
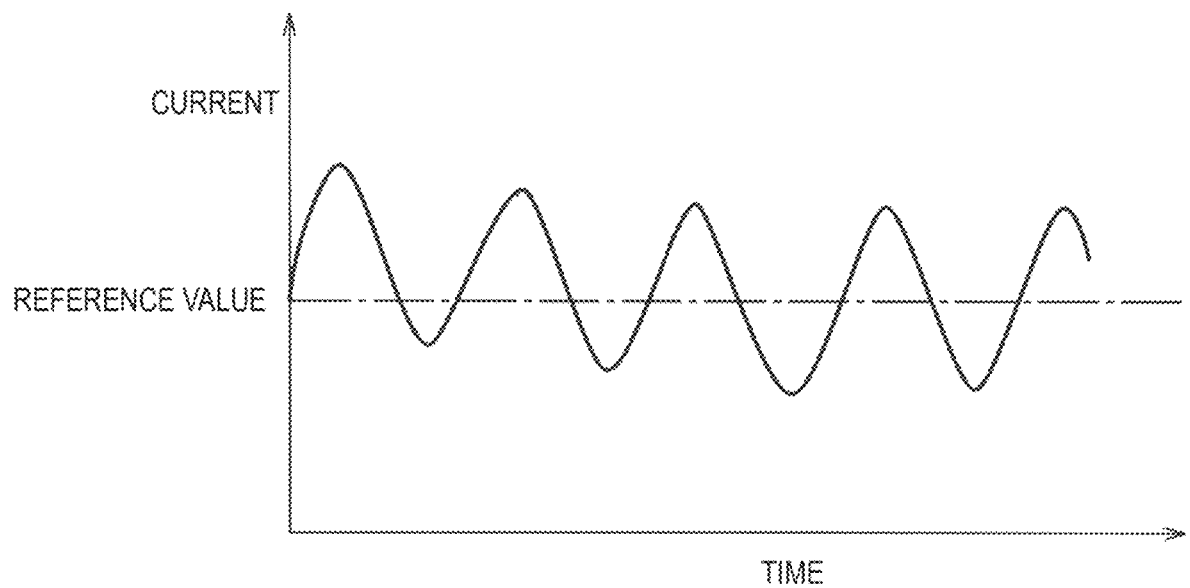
FIG. 15 is a graph of a current flowing through a wire when arc welding is performed while weaving is performed.

FIG. 15 illustrates a graph of a current flowing through the wire when welding is performed while weaving is performed. With reference to FIG. 14 and FIG. 15, the welding controller 5 detects a current flowing through the wire 19 during a period of time when the welding is performed. The welding torch 2 vibrates with a reference point RP set at the movement point being as a center. In a case where the reference point RP is disposed in a center portion of the recess that is formed by the cutouts 85a and 86a, a value of the current oscillates with a reference value of the current being as a center. When the reference point RP is shifted from the center portion of the recess, the center of the current oscillation is shifted from the reference value.

The operation control unit 43 in the present embodiment gradually moves the first movement path so that the center of the current oscillation is directed toward the reference value during the period of time when the welding is performed. That is, the movement path is corrected so that the center of the current oscillation is directed toward the reference value over time. In this way, by detecting the current flowing through the wire during the period of time when the welding is performed, the first movement path can be corrected. In this case as well, the robot controller 4 stores the second movement path after correction. The robot controller 4 can calculate the correction amount of the position of the movement point based on the position of the movement point in the second movement path.

(Second Control for Determining Modification of Position or Orientation of Robot)

Next, a second control for determining a modification method of the position or the orientation of the robot will be described. In the second control, determination is made as to whether to modify the position of the robot 1 or to modify the orientation of the robot 1.

With reference to FIG. 6, FIG. 7, and FIG. 11, the control until the determination unit 60 calculates the score ΔS (control up to step 132 in FIG. 11) is similar to the first control. Next, the determination unit 60 determines whether there is the movement point at which the score ΔS exceeds the predetermined determination value. When there is no movement point at which the score ΔS exceeds the determination value, the control is ended.

In a case where the movement point where the score ΔS exceeds the determination value is present, the determination unit 60 calculates a correlation coefficient between the score ΔS and the correction amount of the position at each of the plurality of movement points MPC1 to MPC6. A correlation coefficient CC can be calculated, for example, by Equation (4) below. Here, a function E(a) represents an average of a. A variable L indicates a distance from the reference point.

$$CC = \frac{E[(|D(L)| - E[|D(L)|])(\Delta S(L) - E[\Delta S(L)])]}{E[(|D(L)| - E[|D(L)|])]E[(\Delta S(L) - E[\Delta S(L)])]} \quad (4)$$

The determination unit 60 determines whether the correlation coefficient is larger than a predetermined determination value. The determination value of the correlation coefficient can be predetermined by the operator and be stored in the storage part 42. As the determination value of the correlation coefficient, for example, 0.5 can be employed.

When the correlation coefficient exceeds the determination value, the determination unit 60 can determine that there is a correlation between correction of the position of the robot 1 and deterioration of the score ΔS. The determination unit 60 determines that the position of the robot 1 needs to be modified. The display part 3b of the teach pendant 3 displays a screen for proposing modification of the position of the robot 1.

On the other hand, in a case where the correlation coefficient is smaller than or equal to the predetermined determination value, the determination unit 60 can determine that there is no correlation between correction of the position of the robot 1 and deterioration of the score ΔS. The determination unit 60 determines that modification of the orientation of the robot 1 needs to be corrected. The display part 3b displays a screen for proposing modification of the orientation of the robot 1.

Additionally, the determination unit 60 can set the movement point with the worst score as the teaching point. Additionally, the display part 3b of the teach pendant 3 can display the movement point with the worst score as a point at which the position or the orientation of the robot 1 should be modified.

Thus, in the second control as well, based on the correlation between the correction amount of the position in the movement path and the quality variable, the modification method of the position or the orientation of the robot 1 can be determined.

(Control for Calculating Modification Amount of Orientation)

The robot controller 4 according to the present embodiment is formed so that the modification amount of the orientation of the robot 1 can be calculated when it is determined that the orientation of the robot 1 should be modified. The movement point where the orientation of the robot 1 is to be modified can be selected in any manner. For example, the movement point selected by the determination unit 60 can be adopted. Alternatively, the operator may set a teaching point for modifying the orientation of the robot 1.

Figure 16:
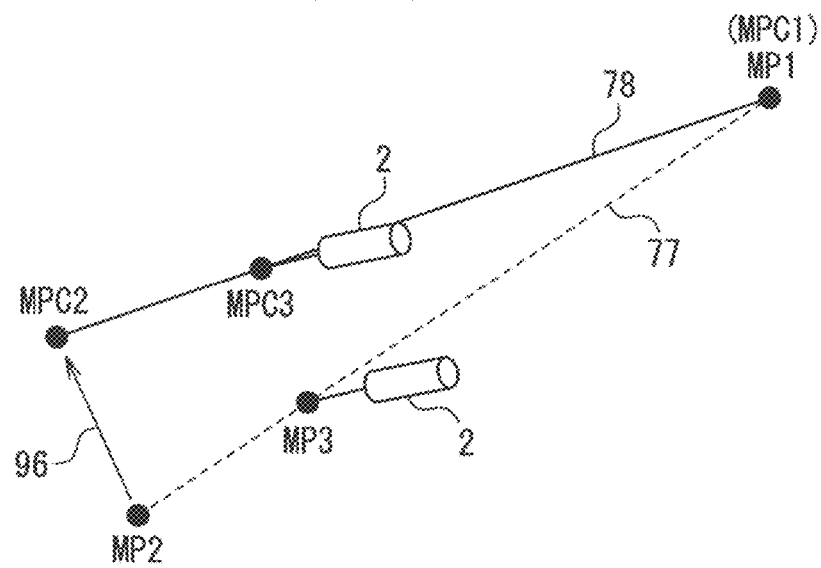
FIG. 16 is a diagram of a movement path before correction and the movement path after correction of a comparative example.

FIG. 16 is a diagram illustrating orientations of the welding torch in the movement path before correction and the movement path after correction in the comparative example. The first movement path 77 of the robot 1 is a path from the movement point MP1 toward the movement point MP2. In the example here, the movement point MP2 is corrected to the movement point MPC2, as indicated by an arrow 96, based on an image by a vision sensor. The second movement path 78 is a path from the movement point MPC1 toward the movement point MPC2. At this time, in the world coordinate system 71, an orientation of the welding torch 2 at the movement point MPC3 after correction is the same as the orientation of the welding torch 2 at the movement point MP3 before correction. In other words, coordinate values of the W-axis, the P-axis, and the R-axis in the world coordinate system 71 are the same.

By correcting the position of the movement point MP3, a direction in which the movement path extends changes. However, since the orientation of the welding torch 2 is not changed, a direction of the welding torch 2 with respect to the direction in which the movement path extends changes. As a result, the direction of the welding torch 2 with respect to a workpiece also changes. In the present example, it is determined that the orientation of the welding torch 2 is not preferred at the movement point MPC3.

Figure 17:
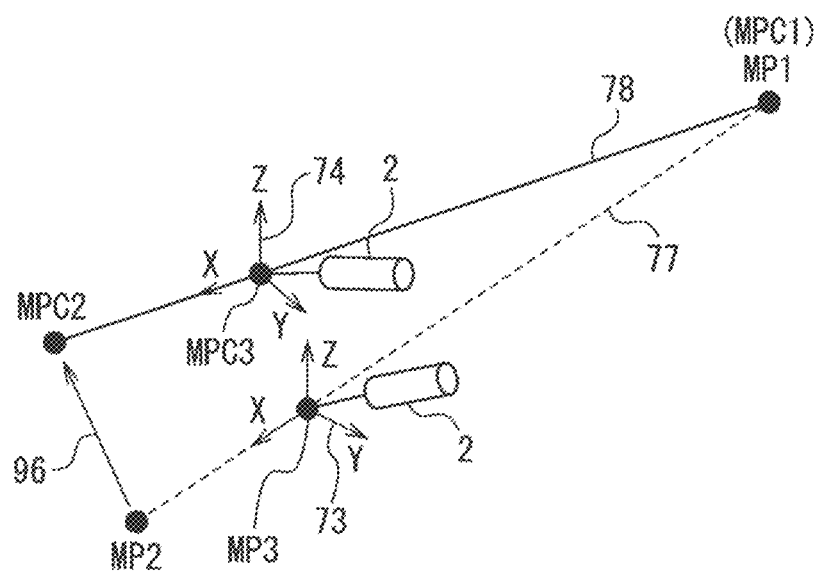
FIG. 17 is a diagram for describing a control for calculating a modification amount of an orientation of the robot.

FIG. 17 illustrates the movement path before correction and the movement path after correction after the orientation of the welding torch is modified in the movement path after correction. The determination unit 60 according to the present embodiment calculates the direction of the welding torch 2 at the movement point MPC3 after correction. The determination unit 60 calculates the orientation of the welding torch 2 so as to maintain the orientation of the welding torch 2 with respect to directions in which the movement paths 77 and 78 extend. In other words, the determination unit 60 calculates the direction of the welding torch 2 such that the direction of the welding torch 2 with respect to the direction in which the second movement path 78 extends is the same as the direction of the welding torch 2 with respect to the direction in which the first movement path 77 extends.

The determination unit 60 sets an auxiliary coordinate system 73 with the movement point MP3 in the first movement path 77 being as an origin. The determination unit 60 sets a direction in which the first movement path 77 extends from the movement point MP3 as the X-axis. Next, the determination unit 60 calculates an axis extending from the movement point MP3 downward in the vertical direction, and sets an axis orthogonal to the axis and the X-axis as the Y-axis. The determination unit 60 sets the Z-axis extending in a direction perpendicular to the X-axis and the Y-axis.

The determination unit 60 sets an auxiliary coordinate system 74 with the movement point MPC3 in the second movement path 78 being as an origin. The X-axis in the auxiliary coordinate system 74 can be set in an extending direction of the second movement path 78. Then, the determination unit 60 sets the Y-axis and the Z-axis in the auxiliary coordinate system 74 by the same method as the auxiliary coordinate system 73.

The determination unit 60 calculates the direction of the welding torch 2 disposed at the movement point MP3 in the first movement path 77 by using coordinate values of the W-axis, the P-axis, and the R-axis in the auxiliary coordinate system 73. In other words, the determination unit 60 converts the orientation of the robot 1 represented by coordinate values in the world coordinate system 71 into coordinate values in the auxiliary coordinate system 73. The coordinate values in the auxiliary coordinate system 73 correspond to the direction of the welding torch 2 with respect to the direction in which the first movement path 77 extends.

The determination unit 60 sets the same values as the coordinate values in the auxiliary coordinate system 73 as coordinate values in the auxiliary coordinate system 74. The coordinate values of the W-axis, the P-axis, and the R-axis in the auxiliary coordinate system 74 are set. The coordinate values in the auxiliary coordinate system 74 at this time correspond to the direction of the welding torch 2 with respect to the direction in which the second movement path 78 extends, and correspond to the direction of the welding torch 2 after the orientation is modified. The determination unit 60 can calculate the orientation of the robot 1 after modification by converting the coordinate values in the auxiliary coordinate system 74 into coordinate values in the world coordinate system 71 of the robot 1.

The determination unit 60 calculates a difference between the orientation of the robot 1 before modification and the orientation of the robot 1 after modification. The display part 3b can display the difference between the orientations of the robot 1. This difference between the orientations corresponds to the modification amount of the orientation of the robot 1 when the operator modifies the orientation. The operator can modify the orientation of the robot 1 in accordance with the display of the display part 3b. In this way, the determination unit 60 can calculate the orientation of the robot 1 in the second movement path 78 based on the orientation of the robot 1 in the first movement path 77. The display part 3b of the teach pendant 3 can display the modification amount of the orientation of the robot 1 calculated by the determination unit 60.

Figure 18:
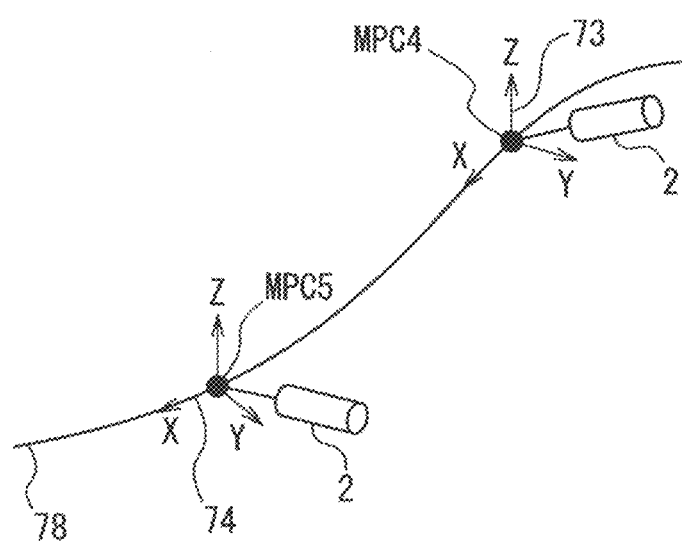
FIG. 18 is a diagram for describing another control for calculating a modification amount of an orientation of the robot.

FIG. 18 illustrates a movement path after correction for describing another control for calculating the modification amount of the orientation of the robot. In the other control for calculating the modification amount of the orientation of the robot, the orientation of the robot 1 in the second movement path 78 is referenced. In the example here, the orientation of the welding torch 2 is modified at the movement point MPC5. The movement point MPC5 is, for example, a movement point where the score ΔS is bad.

The determination unit 60 detects, in the second movement path 78, the movement point MPC4 at which the score ΔS is the best. The determination unit 60 sets the auxiliary coordinate systems 73 and 74 at the respective movement points MPC4 and MPC5. The auxiliary coordinate systems 73 and 74 can be set by the above-described control. In other words, the auxiliary coordinate systems 73 and 74 are set with a direction in which the second movement path 78 extends being as the direction of the X-axis at the respective movement points MPC4 and MPC5.

Next, similarly to the above-described control, the determination unit 60 calculates coordinate values of the direction of the welding torch 2 in the auxiliary coordinate system 73. Then, the determination unit 60 sets the same values as the coordinate values of the direction of the welding torch 2 in the auxiliary coordinate system 73 to coordinate values of the direction of the welding torch 2 in the auxiliary coordinate system 74. Next, the determination unit 60 can calculate the orientation of the robot 1 after modification by converting the coordinate values of the direction of the welding torch 2 in the auxiliary coordinate system 74 into coordinate values of the world coordinate system 71. Then, the determination unit 60 can calculate the modification amount of the orientation of the robot 1 based on a difference between the orientation of the robot 1 before modification and the orientation of the robot 1 after modification. The display part 3b of the teach pendant 3 can display the modification amount of the orientation of the robot 1 calculated by the determination unit 60.

By adopting this control, the direction of the welding torch with respect to the movement path at the movement point that is to be modified can be matched to the direction of the welding torch with respect to the movement path at the movement point having the best score. For this reason, the work quality of the robot apparatus can be expected to be improved. Note that the controller 10 of the robot apparatus 8 may be formed so as not to calculate the modification amount of the orientation of the robot 1. In this case, the operator can determine the modification amount of the orientation of the robot 1 based on the experience.

(Control for Calculating Modification Amount of Position)

The robot controller 4 according to the present embodiment is formed so that the modification amount of the position of the robot 1 can be calculated in a case where it is determined that the position of the robot 1 should be modified. Next, the control for calculating the modification amount of the position of the robot 1 will be described. The movement point where the position of the robot 1 is to be modified can be selected in any manner. For example, the movement point selected by the determination unit 60 can be adopted. Alternatively, the operator may set a teaching point for modifying the position of the robot 1.

Figure 19:
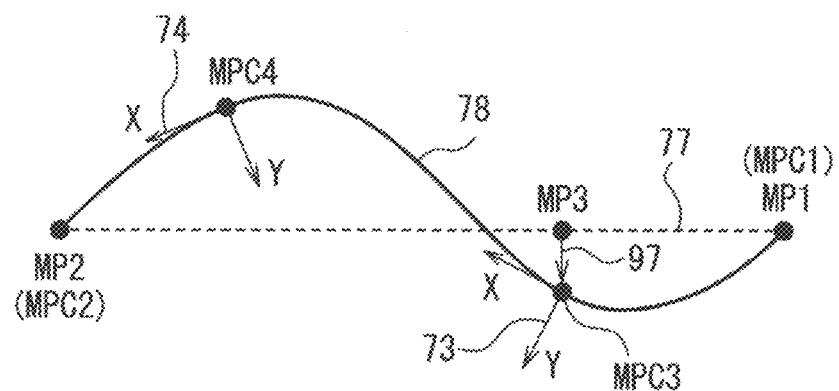
FIG. 19 is a diagram of a movement path for describing a control for calculating a modification amount of a position of the robot.

FIG. 19 illustrates a movement path before correction and a movement path after correction of the robot for describing the modification of the position. In the example illustrated in FIG. 19, the first movement path 77 is set so as to be directed from the movement point MP1 toward the movement point MP2 based on the operation program 41. By correcting the position of the robot 1 in an image captured by the first camera 27, the second movement path 78 is generated from the movement point MPC1 toward the movement point MPC2. The robot apparatus 8 performs welding while changing the position along the second movement path 78.

The movement point MPC4 is a movement point at which the position of the robot 1 is to be modified. The movement point MPC4 is, for example, a movement point where the score ΔS is bad. The determination unit 60 detects the movement point MPC3 having the best score in the second movement path 78. Additionally, the determination unit 60 calculates a movement amount and a movement direction of the position of the movement point MP3 as a correction amount of the position indicated by an arrow 97. This correction amount can be calculated, for example, by coordinate values of the X-axis, the Y-axis, and the Z-axis in the world coordinate system 71.

Next, the determination unit 60 sets the auxiliary coordinate systems 73 and 74 at the respective movement points MPC3 and MPC4. The auxiliary coordinate systems 73 and 74 are a coordinate system with the direction in which the second movement path 78 extends being as the X-axis at the respective movement points MPC3 and MPC4. The auxiliary coordinate systems 73 and 74 can be set by the above-described control.

Figure 20:
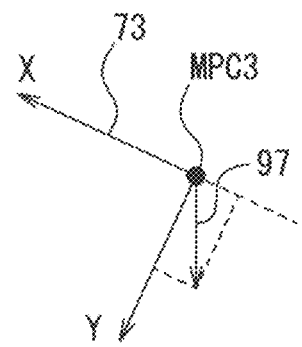
FIG. 20 is a diagram of an auxiliary coordinate system set at a movement point having the best score.

FIG. 20 illustrates the auxiliary coordinate system at the movement point having the best score. The determination unit 60 converts the correction amount of the movement point MPC3 represented by the world coordinate system 71 into coordinate values in the auxiliary coordinate system 73. In other words, a source of the arrow 97 is positioned at an origin of the auxiliary coordinate system 73. The movement amount and the movement direction of at the movement point MP3 are calculated by using coordinate values of the X-axis, the Y-axis, and the Z-axis in the auxiliary coordinate system 73.

Figure 21:
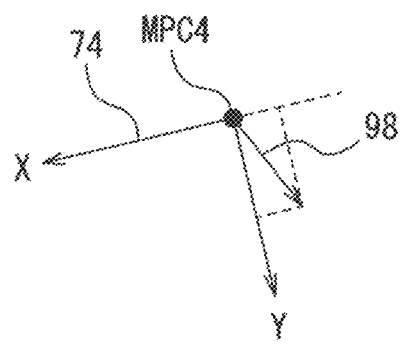
FIG. 21 is a diagram of an auxiliary coordinate system set at a movement point whose position is modified.

FIG. 21 illustrates the auxiliary coordinate system at the movement point at which the position is to be modified. The determination unit 60 sets the coordinate values of the X-axis, the Y-axis, and the Z-axis of the arrow 97 in the auxiliary coordinate system 73 to coordinate values of the X-axis, the Y-axis, and the Z-axis in the auxiliary coordinate system 74. An arrow 98 is generated when the coordinate values are applied to the auxiliary coordinate system 74. The arrow 98 corresponds to the modification amount at the movement point MPC4. The determination unit 60 can calculate the modification amount of the position of the robot 1 by converting the coordinate values of the X-axis, the Y-axis, and the Z-axis in the auxiliary coordinate system 74 into coordinate values of the X-axis, the Y-axis, and the Z-axis in the world coordinate system 71. The movement point after the movement point MPC4 in the second movement path 78 is moved in a direction indicated by the arrow 98 becomes the movement point after the position is modified.

The determination unit 60 can calculate the modification amount of the position by calculating a difference between the coordinate values of the position of the movement point MPC4 in the second movement path 78 and the coordinate values of the position of the robot 1 after modification. The display part 3b of the teach pendant 3 can display the modification amount of the position.

In this manner, in calculation of the modification amount of the position in the present embodiment, by using the movement amount and the movement direction of the position at the movement point with an excellent score, the movement amount of the position and the movement direction of the movement point at which the position is to be modified can be calculated. The movement direction and the movement amount of the movement point with respect to the movement path at the movement point where the score is excellent can be applied to the modification of the movement point at which the position is to be modified. For this reason, the work quality of the robot apparatus 8 can be expected to be improved.

Note that the controller 10 of the robot apparatus 8 may be formed such that the modification amount of the position of the robot 1 is not calculated. In this case, the operator can determine the modification amount of the position of the robot 1 based on the experience.

The first robot apparatus 8 described above includes the first camera 27 for detecting an operation position, and the second camera 28 for performing inspection, but the embodiment is not limited to this. A single camera may detect the operation position and inspect a workpiece. For example, welding is performed while the operation position is detected by using the single camera. After this, the inspection of the workpiece can be performed by changing the setting of the camera and capturing an image of a welded part.

Further, in the first robot apparatus 8, the welding of the workpieces 81 and 82 and the inspection of the quality of the workpieces 81 and 82 are performed by one robot 1, but the embodiment is not limited to this. The robot apparatus may include a robot for performing inspection in addition to a robot for performing welding.

Figure 22:
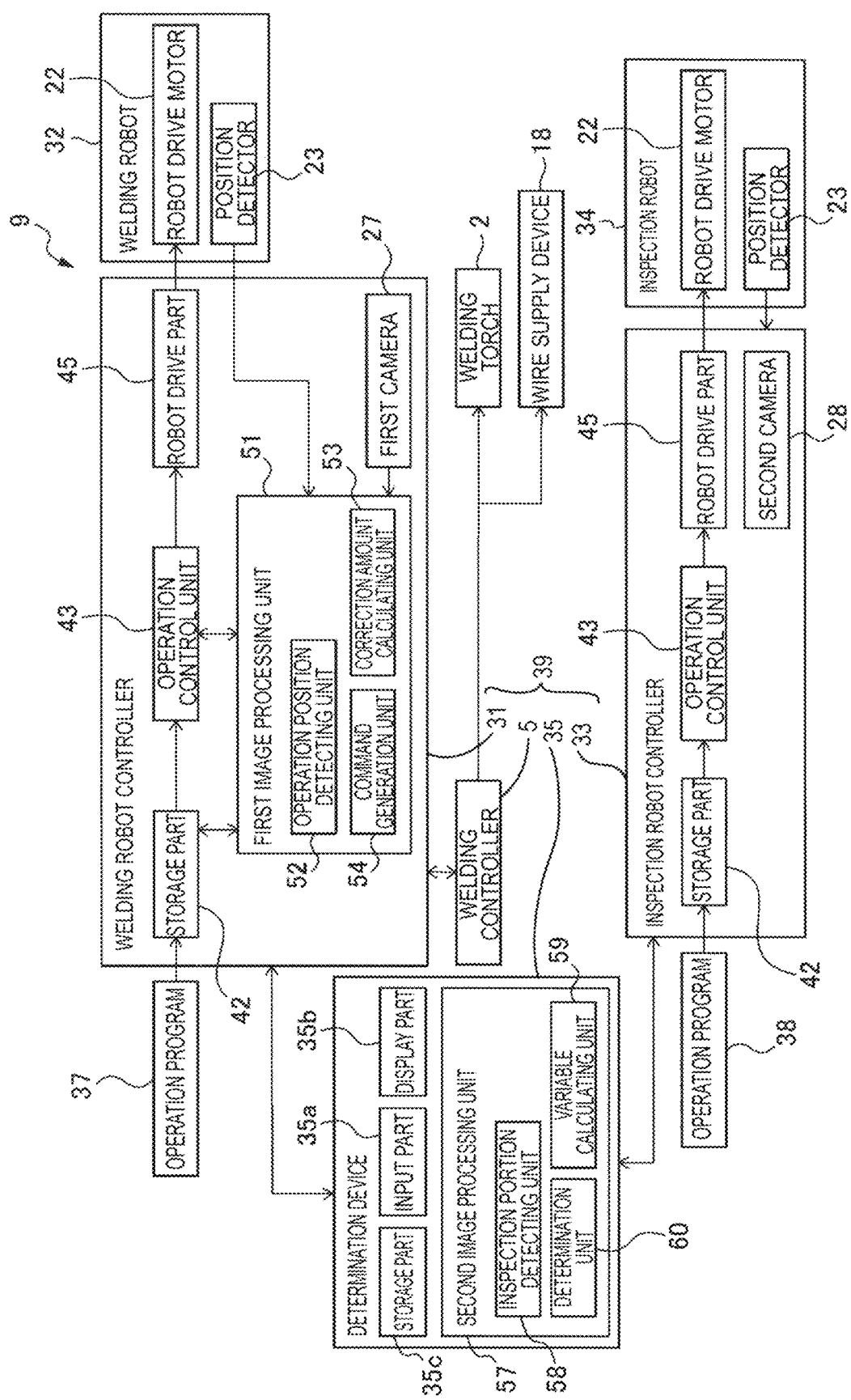
FIG. 22 is a block diagram of a second robot apparatus according to the embodiment.

FIG. 22 illustrates a block diagram of a second robot apparatus according to the present embodiment. The second robot apparatus 9 includes a welding robot 32 for performing a task, and an inspection robot 34 for performing inspection. Each of the welding robot 32 and the inspection robot 34 can be configured with an articulated robot.

The welding robot 32 is a robot that moves the welding torch 2 and performs welding of a workpiece. The welding robot 32 has a configuration in which the second camera 28 is not attached in the robot 1 of the first robot apparatus 8. The welding torch 2 is secured to a wrist of the welding robot 32. The first camera 27 can be attached to the welding torch 2.

The inspection robot 34 is a robot for moving the second camera 28. The inspection robot 34 has a configuration in which the first camera 27 and the welding torch 2 are not attached in the robot 1 of the first robot apparatus 8. The second camera 28 can be attached to a wrist of the inspection robot 34.

A controller 39 of the second robot apparatus 9 includes a welding robot controller 31 that controls the welding robot 32, and an inspection robot controller 33 that controls the inspection robot 34. The welding robot controller 31 includes an arithmetic processing device including a CPU. Similarly to the robot controller 4 of the first robot apparatus 8, the welding robot controller 31 includes the storage part 42, the operation control unit 43, and the robot drive part 45. Also, the welding robot controller 31 includes the first image processing unit 51. The welding robot controller 31 includes a teach pendant. An operation program 37 is input to the welding robot controller 31.

Furthermore, similarly to the welding robot controller 31, the inspection robot controller 33 includes the storage part 42, the operation control unit 43, and the robot drive part 45. The inspection robot controller 33 includes a teach pendant. An operation program 38 is input to the inspection robot controller 33.

The controller 39 of the second robot apparatus 9 includes a determination device 35 for determining an inspection result. The determination device 35 is configured with an arithmetic processing device including a CPU. The determination device 35 includes an input part 35a and a display part 35b. The determination device 35 includes a storage part 35c configured of a storage medium such as a volatile memory, or a non-volatile memory. The determination device 35 includes the second image processing unit 57. An image acquired by the second camera 28 of the inspection robot controller 33 is processed by the determination device 35. The determination device 35 can determine a modification method of a position or an orientation of the robot 1. A determination result by the determination device 35 can be displayed on the display part 35b. An operator can view the display of the display part 35b and define a modification method of the position or the orientation of the robot 1.

Other configurations, operations, and effects of the second robot apparatus 9 are similar to those of the first robot apparatus 8, and therefore the description thereof will not be repeated here.

In the present embodiment, the robot apparatus for performing arc welding is exemplified and described, but the embodiment is not limited to this. The control according to the present embodiment can be applied to any robot apparatus that corrects a position or an orientation of a robot. For example, the control according to the present embodiment can be applied to a robot apparatus that performs laser welding, or a robot apparatus provided with an operation tool that applies an adhesive.

According to an aspect of the present disclosure, it is possible to provide a controller of a robot apparatus capable of determining a modification method of a position and an orientation of a robot.

The above embodiments can be combined as appropriate. In each of the above-described drawings, the same or equivalent portions are denoted by the same reference numerals. It should be noted that the above-described embodiment is an example and does not limit the invention. In addition, the embodiment includes modifications of the embodiment described in the claims.

The invention claimed is:

1. A controller of a robot apparatus provided with a robot and an operation tool, the controller comprising:
   a correction amount calculating unit configured to calculate a correction amount of a position of the robot at a movement point in a first movement path determined in advance;
   an operation control unit configured to drive the robot in a second movement path obtained by correcting the first movement path based on the correction amount calculated by the correction amount calculating unit;
   a shape detecting sensor configured to detect a shape of a part after the robot apparatus performs a task;
   a variable calculating unit configured to calculate a quality variable representing quality of a workpiece based on the shape detected by an output of the shape detecting sensor; and
   at least one processor configured to
      determine a modification method of the position or an orientation of the robot, and
      determine that, in a case where the quality variable deviates from a predetermined determination range, the position or the orientation of the robot needs to be modified based on a correlation between the correction amount of the position of the first movement path and the quality variable,
   wherein the at least one processor is further configured to
      extract a plurality of movement points, each of which has a quality variable in the second movement path, and
      determine that the position or the orientation of the robot needs to be modified in response to a result of comparing the quality variable at each of the plurality of movement points with a predetermined value and comparing the correction amount for one of the plurality of movement points with the correction amount for another of the plurality of movement points.

2. The controller according to claim 1, further comprising:
   a vision sensor configured to capture an image of a part where the robot apparatus performs the task,
   wherein the at least one processor is further configured to detect a position where the task is to be performed based on the image captured by the vision sensor, and
   wherein the correction amount calculating unit calculates the correction amount of the position of the robot based on
      the position which is detected by the at least one processor and at which the task is to be performed, and
      a position of the movement point in the first movement path.

3. The controller according to claim 1, further comprising:
   a display configured to display information related to control of the robot apparatus, wherein
      the at least one processor is configured to extract a best movement point being the movement point having the best quality variable and a worst movement point being the movement point having the worst quality variable in the second movement path, the at least one processor is configured to determine that the position of the robot needs to be modified when the correction amount of the position at the best movement point is smaller than the correction amount of the position at the worst movement point, and the display displays a screen configured to propose modification of the position of the robot, and the at least one processor is configured to determine that the orientation of the robot needs to be modified when the correction amount of the position at the best movement point is larger than the correction amount of the position at the worst movement point, and the display displays a screen configured to propose modification of the orientation of the robot.

4. The controller according to claim 1, further comprising:
a display configured to display information related to control of the robot apparatus, wherein the at least one processor is configured to calculate a correlation coefficient between the correction amount of the position and the quality variable at each of the plurality of movement points, the at least one processor is configured to determine that the position of the robot needs to be modified when the correlation coefficient exceeds a predetermined determination value, and the display displays a screen configured to propose modification of the position of the robot, and the at least one processor is configured to determine that the orientation of the robot needs to be modified when the correlation coefficient is smaller than the predetermined determination value, and the display displays a screen configured to propose modification of the orientation of the robot.

5. A controller of a robot apparatus provided with a robot and an operation tool, the controller comprising:
a correction amount calculating unit configured to calculate a correction amount of a position of the robot at a movement point in a first movement path determined in advance;
an operation control unit configured to drive the robot in a second movement path obtained by correcting the first movement path based on the correction amount calculated by the correction amount calculating unit;
a shape detecting sensor configured to detect a shape of a part after the robot apparatus performs a task;
a variable calculating unit configured to calculate a quality variable representing quality of a workpiece based on the shape detected by an output of the shape detecting sensor;
at least one processor configured to
determine a modification method of the position or an orientation of the robot, and
determine that, in a case where the quality variable deviates from a predetermined determination range, the position or the orientation of the robot needs to be modified based on a correlation between the correction amount of the position of the first movement path and the quality variable; and
a display configured to display information related to control of the robot apparatus, wherein
the at least one processor calculates a direction of the operation tool with respect to an extending direction of the first movement path at the movement point in the first movement path corresponding to the movement point where the orientation needs to be modified in the second movement path, and calculates a modification amount of the orientation of the robot in such a manner that a direction of the operation tool with respect to an extending direction of the second movement path at the movement point in the second movement path is the same as a direction of the operation tool with respect to the extending direction of the first movement path, and the display displays the modification amount of the orientation of the robot calculated by the at least one processor.

6. A controller of a robot apparatus provided with a robot and an operation tool, the controller comprising:
a correction amount calculating unit configured to calculate a correction amount of a position of the robot at a movement point in a first movement path determined in advance;
an operation control unit configured to drive the robot in a second movement path obtained by correcting the first movement path based on the correction amount calculated by the correction amount calculating unit;
a shape detecting sensor configured to detect a shape of a part after the robot apparatus performs a task;
a variable calculating unit configured to calculate a quality variable representing quality of a workpiece based on the shape detected by an output of the shape detecting sensor; and
at least one processor configured to
determine a modification method of the position or an orientation of the robot, and
determine that, in a case where the quality variable deviates from a predetermined determination range, the position or the orientation of the robot needs to be modified based on a correlation between the correction amount of the position of the first movement path and the quality variable,
wherein the at least one processor is further configured to
calculate a correction coefficient between the correction amount of the position and a quality variable at each of a plurality of movement points, and
determine that the position or the orientation of the robot needs to be modified in response to a result of comparing the correlation coefficient with a predetermined determination value.

7. The controller according to claim 6, further comprising:
a vision sensor configured to capture an image of a part where the robot apparatus performs the task,
wherein the at least one processor is further configured to detect a position where the task is to be performed based on the image captured by the vision sensor, and
wherein the correction amount calculating unit calculates the correction amount of the position of the robot based on
the position which is detected by the at least one processor and at which the task is to be performed, and
a position of the movement point in the first movement path.

8. The controller according to claim 6, further comprising:
a display configured to display information related to control of the robot apparatus, wherein
the at least one processor is configured to extract a best movement point being the movement point having the best quality variable, and a worst movement point being the movement point having the worst quality variable in the second movement path, the at least one processor is configured to determine that the position of the robot needs to be modified when the correction amount of the position at the best movement point is smaller than the correction amount of the position at the worst movement point, and the display displays a screen configured to propose modification of the position of the robot, and the at least one processor is configured to determine that the orientation of the robot needs to be modified when the correction amount of the position at the best movement point is larger than the correction amount of the position at the worst movement point, and the display displays a screen configured to propose modification of the orientation of the robot.

9. The controller according to claim 6, further comprising:

a display configured to display information related to control of the robot apparatus, wherein the at least one processor is configured to determine that the position of the robot needs to be modified when the correlation coefficient exceeds the predetermined determination value, and the display displays a screen configured to propose modification of the position of the robot, and the at least one processor is configured to determine that the orientation of the robot needs to be modified when the correlation coefficient is smaller than the predetermined determination value, and the display displays a screen configured to propose modification of the orientation of the robot.

* * * * *